United States Patent
Wintzer et al.

(10) Patent No.: US 9,689,545 B2
(45) Date of Patent: Jun. 27, 2017

(54) OPTICAL ELEMENT HAVING A PLURALITY OF INTERPOSED OPTICAL ARRAYS

(71) Applicant: DOCTER OPTICS SE, Neustadt an der Orla (DE)

(72) Inventors: Wolfram Wintzer, Jena (DE); Lars Arnold, Neustadt (DE); Alois Willke, Buseck (DE); Sandro Plietzsch, Linda (DE)

(73) Assignee: Docter Optics SE, Neustadt an der Orla (DE)

( * ) Notice: Subject to any disclaimer, the term of this patent is extended or adjusted under 35 U.S.C. 154(b) by 80 days.

(21) Appl. No.: 14/428,574

(22) PCT Filed: Sep. 14, 2013

(86) PCT No.: PCT/EP2013/002766
§ 371 (c)(1),
(2) Date: Mar. 16, 2015

(87) PCT Pub. No.: WO2014/056568
PCT Pub. Date: Apr. 17, 2014

(65) Prior Publication Data
US 2015/0211704 A1      Jul. 30, 2015

(30) Foreign Application Priority Data

Oct. 14, 2012  (DE) .................. 10 2012 020 061
Jun. 14, 2013  (DE) .................. 10 2013 009 983
(Continued)

(51) Int. Cl.
*G02B 6/00* (2006.01)
*F21V 5/00* (2015.01)
(Continued)

(52) U.S. Cl.
CPC .... *F21S 48/1225* (2013.01); *B29D 11/00663* (2013.01); *C03B 11/082* (2013.01);
(Continued)

(58) Field of Classification Search
CPC ..... F21V 5/007; G02B 6/0075; G02B 6/0076; G02B 6/0078; G02B 6/008; G01D 11/28;
(Continued)

(56) References Cited

U.S. PATENT DOCUMENTS 4,306,716 A * 12/1981 James ................. A63F 9/24
                                                      273/460
4,544,259 A * 10/1985 Kanaoka .............. G02B 6/4249
                                                      346/46
(Continued)

FOREIGN PATENT DOCUMENTS

AT         513915       8/2014
DE         10231326     2/2004
(Continued)

OTHER PUBLICATIONS

International Preliminary Report on Patentability, Application No. PCT/EP2013/002766, dated Apr. 14, 2015.
(Continued)

*Primary Examiner* — Ismael Negron
(74) *Attorney, Agent, or Firm* — Barnes & Thornburg LLP

(57) ABSTRACT

An optical element including a first head lens array having at least first and second head lenses joined together by a bar, and at least one second bead lens array having at least a third head lenses arranged between the first and second head lenses.

23 Claims, 21 Drawing Sheets

(30) Foreign Application Priority Data

Jun. 18, 2013 (DE) .................. 10 2013 010 112
Aug. 14, 2013 (DE) .................. 10 2013 013 456

(51) Int. Cl.
| | | |
|---|---|---|
| *F21S 8/10* | (2006.01) | |
| *G02B 19/00* | (2006.01) | |
| *B29D 11/00* | (2006.01) | |
| *C03B 11/08* | (2006.01) | |
| *F21W 101/10* | (2006.01) | |
| *F21Y 115/10* | (2016.01) | |

(52) U.S. Cl.
CPC ...... *F21S 48/1241* (2013.01); *G02B 19/0066* (2013.01); *C03B 2215/412* (2013.01); *C03B 2215/414* (2013.01); *C03B 2215/79* (2013.01); *F21W 2101/10* (2013.01); *F21Y 2115/10* (2016.08)

(58) Field of Classification Search
CPC ............ F21Y 2105/10; F21Y 2105/14; F21Y 2105/16
See application file for complete search history.

(56) References Cited

U.S. PATENT DOCUMENTS

| | | | | |
|---|---|---|---|---|
| 4,800,466 A * | 1/1989 | Bauer | ................. | B60H 1/0065 362/23.15 |
| 4,914,731 A * | 4/1990 | Chen | ................. | G09F 9/33 257/E25.02 |
| 5,327,328 A * | 7/1994 | Simms | ................. | G02B 6/0001 362/23.07 |
| 5,876,239 A * | 3/1999 | Morin | ................. | H01R 13/717 439/490 |
| 6,463,204 B1 * | 10/2002 | Ati | ................. | G02B 6/0008 385/146 |
| 7,828,448 B2 * | 11/2010 | Kim | ................. | F21K 9/00 348/771 |
| 8,684,765 B2 * | 4/2014 | Shirk | ................. | G02B 6/0008 362/551 |
| 9,389,104 B2 * | 7/2016 | Mouard | ................. | G01D 13/00 |
| 2006/0067090 A1 | 3/2006 | Lee | | |
| 2006/0119781 A1 | 6/2006 | Godo | | |
| 2009/0016074 A1 | 1/2009 | Dolson | | |
| 2012/0147621 A1 * | 6/2012 | Holten | ................. | F21V 5/00 362/551 |
| 2015/0153019 A1 * | 6/2015 | Yoshizumi | ................. | G02B 6/0096 362/555 |
| 2015/0226395 A1 * | 8/2015 | Taudt | ................. | F21S 48/1154 362/511 |

FOREIGN PATENT DOCUMENTS

| | | |
|---|---|---|
| DE | 102007035021 | 1/2009 |
| DE | 10200803383 | 1/2010 |
| WO | 2007027474 | 3/2007 |
| WO | 2009109209 | 9/2009 |
| WO | 2009117834 | 10/2009 |

OTHER PUBLICATIONS

English translation of International Preliminary Report on Patentability, Application No. PCT/EP2013/002766, dated Apr. 14, 2015.
International Search Report, Application No. PCT/EP2013/002766, dated Jan. 27, 2014.

* cited by examiner

US 9,689,545 B2

OPTICAL ELEMENT HAVING A PLURALITY OF INTERPOSED OPTICAL ARRAYS

CROSS REFERENCE TO RELATED APPLICATIONS

This application is a U.S. nationalization under 35 U.S.C. §371 of International Application No. PCT/EP2013/002766, filed Sep. 14, 2013, which claims priority to German Application No. 102012020061.7, filed Oct. 14, 2012; German Application No. 102013009983.8, filed Jun. 14, 2013; German Application No. 102013010112.3, filed Jun. 18, 2013; and German Application No. 102013013456.0, filed Aug. 14, 2013.

FIELD OF THE INVENTION

The invention refers to an optical element and a primary optic array vehicle headlights[i].

[i] translation remark: also termed as "headlamp"

BACKGROUND INFORMATION

WO 2007/027474 A2 discloses a solid-state light source useable as automotive headlamp lighting, which light source comprises a plurality of LED units arrayed to emit light generally about an axis and a light transmissive light guide having a plurality of primary optics having input widows, wherein each LED unit faces a respective input window. A common output window axially aligned with the input windows is provided, wherein smooth sidewalls extend between the input windows and the output window. The light source further comprises a secondary optic implemented as a lens axially aligned with the output window and having a focal point positioned relative to the output window to refract light received from the output window into a preferred beam pattern directed to a field to be illuminated.

SUMMARY

The invention is directed to an optical element for a vehicle headlight, for example a motor vehicle headlight, including a monolithically pressed first primary optic array of transparent material, advantageously inorganic glass, and at least one monolithically pressed second primary optic array of said (same) or a transparent material, advantageously inorganic glass, wherein the first primary optic array comprises
 a first primary optic having a (for example optically effective) light entry face and a (for example optically effective) light exit face,
 at least one second primary optic having a (for example optically effective) light entry face and a (for example optically effective) light exit face, and
 a web[ii] connecting the first primary optic mechanically to the second primary optic,
wherein the second primary optic array comprises
 a third primary optic having a (for example optically effective) light entry face and a (for example optically effective) light exit face,
 in particular at least one fourth primary optic having a (for example optically effective) light entry face and a (for example optically effective[iii]) light exit face, and
 in particular a (second) web connecting the third primary optic mechanically to the fourth primary optic,
and wherein the first primary optic array and the second primary optic array are, respectively, positioned or arranged (and, particularly, fixed with respect to each other, for example by means of die casting, extruding, mutual injection molding around, joining, bonding, cementing, gluing, sticking together and/or clamping with respect to each other) such that they engage with each other such that they form an array, in which
 in particular the second primary optic is (directly) arranged between the third primary optic and the fourth primary optic and
 the third primary optic is (directly) arranged between the first primary optic and the second primary optic.

[ii] translation remark: also termed as "bar"
[iii] translation remark: also termed as "operative"

In the sense of the invention, an optically effective light entry (sur-)face and/or an optically effective light exit (sur-)face, respectively, is an optically effective surface is. In the sense of the invention(s), an optically effective (sur-)face is, in particular, a surface at which, when using the primary optic according to its purpose, light will be refracted. In the sense of the invention(s), an optically effective surface is, in particular, a surface at which, when using the primary optic according to its purpose, the direction of light which passes through this surface will be changed.

In the sense of the invention(s) is, transparent material is in particular glass. Transparent material, in the sense of the invention(s), is particularly inorganic glass. In the sense of the invention(s), transparent material is for example silicate glass. In the sense of the invention(s), transparent material is for example glass as described in PCT/EP2008/010136. In the sense of the invention(s), glass for example comprises
 0.2 to 2% by weight $Al_2O_3$,
 0.1 to 1% by weight $Li_2O$,
 0.3, for example 0.4 to 1.5% by weight $Sb_2O_3$,
 60 to 75% by weight $SiO_2$,
 3 to 12% by weight $Na_2O$,
 3 to 12% by weight $K_2O$, and
 3 to 12% by weight CaO.

In the sense of the invention(s), a primary optic may be a light tunnel. In the sense of the invention, a primary optic, in particular, serves for aligning light which is irradiated into the light entry face, wherein it is particularly provided for that (accordingly) aligned light will exit through the light exit (sur-)face.

In an embodiment of the invention, the first primary optic, the second primary optic, the third primary optic and/or the four primary optic comprise/s, between its/their light entry face/s and enters its/their light exit face/s, a press-molded surface, in particular for the total reflection of light irradiated into the light entry face. In a further embodiment of the invention, the distance
 between the second primary optic and the third primary optic amounts to no more than 0.5 mm,
 between the second primary optic and the fourth primary optic amounts to no more than 0.5 mm, and/or
 between the first primary optic and the third primary optic amounts to no more than 0.5 mm.

In a further embodiment of the invention, the second primary optic comprises a fifth primary optic including a (for example optically effective) light entry face and a (for example optically effective) light exit face, wherein the (second) web mechanically connects the fourth primary optic, the fifth primary optic and the third primary optic to each other such that the fourth primary optic and the third primary optic are arranged on a first side of the (second) web, and that the fifth primary optic is arranged on a second side of the (second) web, which second side lies opposite to the first side of the (second) web, wherein the transition from the fifth primary optic to the (second) web lies between the transition from the fourth primary optic to the (second) web and the transition from the third primary optic to the (second) web.

The invention is furthermore directed to a primary optic pressed monolithically from transparent material, advantageously inorganic glass, for a vehicle headlight, for example a motor vehicle headlight, wherein the primary optic comprises

- a first primary optic having a (for example optically effective) light entry face and a (for example optically effective) light exit face,
- a second primary optic having a (for example optically effective) light entry face and a (for example optically effective) light exit face,
- at least one third primary optic having a (for example optically effective) light entry face and a (for example optically effective) light exit face, and
- a web connecting the first primary optic, the second primary optic, and the third primary optic mechanically to each other such that the first primary optic and the third primary optic are arranged on a first side of the web, and that the second primary optic is arranged on a second side of the web, said second side opposing the first side, wherein the transition from the second primary optic to the web lies between the transition from the first primary optic to the web and the transition from the third primary optic to the web.

In a further embodiment of the invention, the first primary object, the second primary optic, and/or the third primary object comprise/s, between its/their light entry face/s and its/their light exit face/s, a press-molded (TIR) surface, in particular for the total reflection of light irradiated into the light entry face. In a further embodiment of the invention, the first primary object and/or the second primary optic is/are configured according to the primary optic array as described in the previous paragraph.

The invention is furthermore directed to an optical element for a vehicle headlight, for example a motor vehicle headlight, including a monolithically pressed first primary optic array of transparent material, advantageously inorganic glass, including a monolithically pressed second primary optic array of transparent material, advantageously inorganic glass, and including at least one monolithically pressed third primary optic array of the said or a transparent material, advantageously inorganic glass, wherein the first primary optic array comprises
- a first primary optic having a (for example optically effective) light entry face and a (for example optically effective) light exit face,
- at least one second primary optic having a (for example optically effective) light entry face and a (for example optically effective) light exit face, and
- a web connecting the first primary optic mechanically to the second primary optic, wherein the third primary optic array comprises
- a third primary optic having a (for example optically effective) light entry face and a (for example optically effective) light exit face,
- at least one fourth primary optic having a (for example optically effective) light entry face and a (for example optically effective) light exit face, and
- a web connecting the third primary optic mechanically to the fourth primary optic, wherein the second primary optic array comprises
- a fifth primary optic having a (for example optically effective) light entry face and a (for example optically effective) light exit face,
- a sixth primary optic having a (for example optically effective) light entry face and a (for example optically effective) light exit face, and
- at least one seventh primary optic having a (for example optically effective) light entry face and a (for example optically effective) light exit face, and
- a web connecting the fifth primary optic, the sixth primary optic and the seventh primary optic mechanically to each other such that the fifth primary optic and the seventh primary optic are arranged on a first side of the web, and that the sixth primary optic is arranged on a second side of the web which side lies opposite said first side, wherein the transition from the sixth primary optic to the web lies between the transition from the fifth primary optic to the web and the transition from the seventh primary optic to the web, and wherein the first primary optic array, the second primary optic array and the third primary optic array are, respectively, positioned or arranged (and, in particular, fixed with respect to each other, for example by means of die casting, extruding, mutual injection molding around, joining, bonding, cementing, gluing, sticking together and/or clamping) such that they mesh or engage with each other such that they form a first array, in which
- the second primary optic is (directly) arranged between the fifth primary optic and the seventh primary optic and
- the fifth primary optic is (directly) arranged between the first primary optic and the second primary optic,
  and that they form a second array, in which the sixth primary optic is arranged (directly) between the third primary optic and the fourth primary optic. In this context, it may be provided for that the optical axes of the primary optics of the first array are tilted, slanted or inclined, respectively, in particular by a few degrees with regard to the optical axes of the primary optics of the second array.

In an embodiment of the invention, the first primary optic, the second primary optic, the third primary optic, the fourth primary optic, the fifth primary optic, the sixth primary optic and/or the seven primary optic comprise/s, between its/their light entry face/s and its/their light exit face/s, a press-molded[iv] surface, in particular for the total reflection of light irradiated into the light entry face. In a further embodiment of the invention, the distance
- between the second primary optic and the fifth primary optic amounts to no more than 0.5 mm,
- between the second primary optic and the seventh primary optic amounts to no more than 0.5 mm,
- between the first primary optic and the fifth primary optic amounts to no more than 0.5 mm,
- between the sixth primary optic and the third primary optic amounts to no more than 0.5 mm, and/or
- between the sixth primary optic and the fourth primary optic amounts to no more than 0.5 mm,

[iv] translation remark: also termed as "bright-pressed" or "blank-molded"

The invention is furthermore directed an optical element for a vehicle headlight, for example a motor vehicle headlight including a monolithically pressed first primary optic array of transparent material, advantageously inorganic glass, including a monolithically pressed second primary optic array of the said or a transparent material, advantageously inorganic glass, and including at least one monolithically pressed third primary optic array of the said or a transparent material, advantageously inorganic glass, wherein the first primary optic array comprises a first primary optic having a (for example optically effective) light entry face and a (for example optically effective) light exit face, at least one second primary optic having a (for example optically effective) light entry face and a (for example optically effective) light exit face, and a web connecting the first primary optic mechanically to the second primary optic, wherein the second primary optic array comprises a third primary optic having a (for example optically effective) light entry face and a (for example optically effective) light exit face, at least one fourth primary optic having a (for example optically effective) light entry face and a (for example optically effective) light exit face, and a web connecting the third primary optic mechanically to the fourth primary optic, wherein the third primary optic array comprises a fifth primary optic having a (for example optically effective) light entry face and a (for example optically effective) light exit face, at least one sixth primary optic having a (for example optically effective) light entry face and a (for example optically effective) light exit face, and a web connecting the fifth primary optic mechanically to the sixth primary optic, wherein the first primary optic array, the second primary optic array and the third primary optic array, respectively, are positioned or arranged (and, in particular, fixed with respect to each other, for example by means of die casting, extruding, mutual injection molding around, joining, bonding, cementing, gluing, sticking together and/or clamping) such that they mesh or engage with each other such that they form an array, in which the first primary optic is arranged between the third primary optic and the fourth primary optic, the second primary optic is (directly) arranged between the fifth primary optic and the sixth primary optic, and the fourth primary optic and the fifth primary optic are arranged between the first primary optic and the second primary optic.

In an embodiment of the invention, the first primary optic, the second primary optic, the third primary optic, the fourth primary optic, the fifth primary optic, and/or the sixth primary optic comprise/s, between its/their light entry face/s and its/their light exit face/s, a press-molded surface, in particular for the total reflection of light irradiated into the light entry face. In a further embodiment of the invention, the distance between the first primary optic and the third primary optic amounts to no more than 0.5 mm, between the first primary optic and the fourth primary optic amounts to no more than 0.5 mm, between the second primary optic and the fifth primary optic amounts to no more than 0.5 mm, between the second primary optic and the sixth primary optic amounts to no more than 0.5 mm, and/or between the fourth primary optic and the fifth primary optic amounts to no more than 0.5 mm.

In an embodiment of the invention, the first primary optic array comprises a seventh primary optic including a light entry face and a light exit face, wherein the first primary optic and the second primary optic are arranged on a first side of the web of the first primary optic array, and wherein the seventh primary optic is arranged on a second side of the web of the first primary optic array, which second side lies opposite to the first side of the web of the first primary optic array, wherein the transition from the seventh primary optic to the web of the first primary optic array is arranged, in particular centrally, between the transition from the first primary optic to the web of the first primary optic array and the transition from the second primary optic to the web of the first primary optic array. Herein, it is possible that the optical axes of the first primary optic and of the second primary optic can be tilted, slanted or inclined, respectively, for example by a few degrees with regard to the optical axes of the seventh primary optic.

In an embodiment of the invention, the optical element comprises a monolithically pressed fourth primary optic array of the said or a transparent material, advantageously inorganic glass, wherein the fourth primary optic array comprises an eighth primary optic including a light entry face and a light exit face, at least one ninth primary optic including a light entry face and a light exit face, and a web connecting the eighth primary optic mechanically to the ninth primary optic, wherein the first primary optic array and the fourth primary optic array are positioned and/or fixed with respect to each other such that they engage each other to form a further array, in which the seventh primary optic is arranged between the eighth primary optic and the fourth primary optic. With such an optical element it is possible to achieve a particularly homogeneous light distribution (reduction or avoidance, respectively, of the so-called picket effect).

In an embodiment of the invention, the first primary optic, the second primary optic, the third primary optic, the fourth primary optic, the fifth primary optic, the sixth primary optic, the seventh primary optic, the eighth primary optic and/or the ninth primary optic comprise/s, between its/their light entry face/s and its/their light exit face/s, a press-molded surface, in particular for the total reflection of light irradiated into the light entry face.

In an embodiment of the invention(s), a vehicle headlight, for example a motor vehicle headlight includes an aforementioned primary optic array and/or an aforementioned optical element as well as a light source arrangement/array comprising for example an LED, for making light enter into the light entry face(s). In a further embodiment of the invention(s), the light source arrangement/array comprises at least one LED or an array of LEDs. In an embodiment of the invention(s), the light source array comprises at least one OLED or an array of OLEDs. For example, the light source arrangement/array can also be an aerial luminous field.

In a further embodiment of the invention(s), a light entry face and/or a light exit face of primary optic are pressed or press-molded, respectively.

In a further embodiment of the invention(s), a primary optic array comprises less than 10 primary optics. In a further embodiment of the invention(s), a primary optic array includes 4 or 5 or 6 primary optics.

In a further embodiment of the invention(s), the distance of a primary optic of the first primary optic array to a neighbouring primary optic of the second primary optic array amounts to no more than 3.5 mm. In a further embodiment of the invention(s), the distance of a primary optic of the first primary optic array to a neighbouring primary optic of the second primary optic array amounts to no more than 1 mm. In a further embodiment of the invention(s), the distance of a primary optic of the first primary optic array to a neighbouring primary optic of the second primary optic array amounts to no more than 0.5 mm. In a further embodiment of the invention(s), the distance of a primary optic of the first primary optic array to a neighbouring primary optic of the second primary optic array amounts to 0.2 to 0.075 mm. In a further embodiment of the invention(s), the distance of a primary optic of the first primary optic array to a neighbouring primary optic of the second primary optic array amounts to no less than 0.05 mm.

The invention is furthermore directed to a method for manufacturing an optical element for a vehicle headlight, for example a motor vehicle headlight, in particular by a method for manufacturing an aforementioned optical element, and wherein a group of mold sets is provided which comprises at least two, for example at least three, for example at least four, for example all of a selection of mold sets, wherein the selection of mold sets comprises

- a first mold set for pressing, for example press-molding a monolithic primary optic array (of a first type), which includes two primary optics (each having a light entry face and a light exit face) connected to each other by a web, whose distance from one another is larger than their width and is smaller than double their width,
- a second mold set for pressing, for example press-molding a monolithic primary optic array (of a second type), which includes two primary optics (each having a light entry face and a light exit face) connected to each other by a web, whose distance from one another is larger than their width and is smaller than three times their width,
- a third mold set for pressing, for example press-molding a monolithic primary optic array (of a third type), which includes three primary optics (each having a light entry face and a light exit face) connected to each other by a web, wherein the distance of neighbouring primary optics from one another is larger than their width and smaller than double their width,
- a fourth mold set for pressing, for example press-molding a monolithic primary optic array (of a fourth type), which includes three primary optics (each having a light entry face and a light exit face) connected to each other by a web, wherein the distance of neighbouring primary optics of from one another is larger than double their width and smaller than three times their width,
- at least one fifth mold set for pressing, for example press-molding a monolithic primary optic array (of a fifth type), which includes four primary optics (each having a light entry face and a light exit face) connected to each other by a web, wherein the distance of neighbouring primary optics from one another is larger than double with their width and smaller than three times their width, wherein a first primary optic array is pressed, for example press-molded, by means of the first, the second, the third, the fourth or the fifth mold set, wherein at least a second primary optic array is pressed, for example press-molded by means of the first, the second, the third, the fourth, or the fifth mold sets, and wherein the first primary optic array and the second primary optic array are slid[v] into each other.

[v] translation remark: also termed as "telescoped with respect to each other" or "pushed into each other"

In a further embodiment of the invention, the distance of the primary optics of a primary optic array of the first type is no larger than their width plus 1 mm, in particular no larger than their width plus 0.5 mm. In a further embodiment of the invention, the distance of the primary optics of a primary optic array of the second type is no larger than double their width plus 1 mm, in particular no larger than double their width plus 0.5 mm. In a further embodiment of the invention, the distance of neighbouring primary optics of a primary optic array of a third type is no larger than their width plus 1 mm, in particular no larger than their width plus 0.5 mm. In a further embodiment of the invention, the distance of neighbouring primary optics of a primary optic array of a fourth type is no larger than double their width plus 1 mm, in particular no larger than double their width plus 0.5 mm. In a further embodiment of the invention, the distance of neighbouring primary optics of a primary optic array of a fifth type is no larger than double their width plus 1 mm, in particular no larger than double their width plus 0.5 mm.

In a further embodiment of the invention, the first primary optic array is pressed, for example press-molded, by means of the first set of molds, and the second primary optic array is pressed, for example press-molded, by means of the first set of molds. In a further embodiment of the invention, the first primary optic array is pressed, for example press-molded, by means of the first set of molds, and the second primary optic array is pressed, for example press-molded, by means of the third set of molds. In a further embodiment of the invention, the first primary optic array is pressed, for example press-molded, by means of the first set of molds, the second primary optic array is pressed, for example press-molded, by means of the second set of molds, and a third primary optic array is pressed, for example press-molded, by means of the first set of molds, wherein the first, the second, and the third primary optic arrays are slid into each other. In a further embodiment of the invention, the first primary optic array is pressed, for example press-molded, by means of the first set of molds, the second primary optic array is pressed, for example press-molded, by means of the third set of molds, and a third primary optic array is pressed, for example press-molded, by means of the first set of molds, wherein the first, the second and the third primary optic arrays are slid into each other. In a further embodiment of the invention, the first primary optic array is pressed, for example press-molded, by means of the first set of molds, the second primary optic array is pressed, for example press-molded, by means of the second set of molds, a third primary optic array is pressed, for example press-molded, by means of the second set of molds, and a fourth primary optic array is pressed, for example press-molded by means of the first set of molds, wherein the first, the second, the third and the fourth of primary optic arrays are slid into each other.

In the sense of the invention, press-molding (also termed bright-pressing, blank-molding or blank-pressing) is to be interpreted to mean that a (for example optically effective) surface is to be pressed such that any subsequent post-treatment of the contours of this (for example optically effective) surface may be omitted/dispensed with/need not be provided for at all, respectively. Thus, it is, in particular, possible that a press-molded surface need not be ground after press-molding.

It is well possible that the optical axes of the single primary optics be inclined or tilted, respectively, with respect to the optical axes of other primary optics, by, for example, some degrees. It is well possible that the optical axes of the primary optics of the one primary optic array are inclined or tilted, respectively, by, for example, some degrees with respect to the optical axes of another primary optic array, which has been slid into the first primary optic array.

It is well possible that the distances between the primary optics may vary, i.e. they are not equidistant. It is well possible that the distances of the primary optics of one primary optic array differ with regard to their width.

It is well possible that the light entry faces and/or the light exit faces of the primary optics or of the one of the primary optics are ground.

It is, for example, well possible that the distances of two neighbouring primary optics in one array (not primary optics array) are no smaller than 0.1 mm, for example no smaller than 50 µm, for example no smaller than 10 µm.

In the sense of the invention(s), a motor vehicle is, for example, a land vehicle for individual use in road traffic. In the sense of the invention(s), motor vehicles are for example not restricted to land vehicles including a combustion engine.

It is provided for an improved optic for a vehicle headlight, for example for a motor vehicle headlight. It is provided also for reducing the costs for manufacturing vehicle headlights, e.g. vehicle headlights having primary optics made from an organic glass.

DETAILED DESCRIPTION

Figure 1:
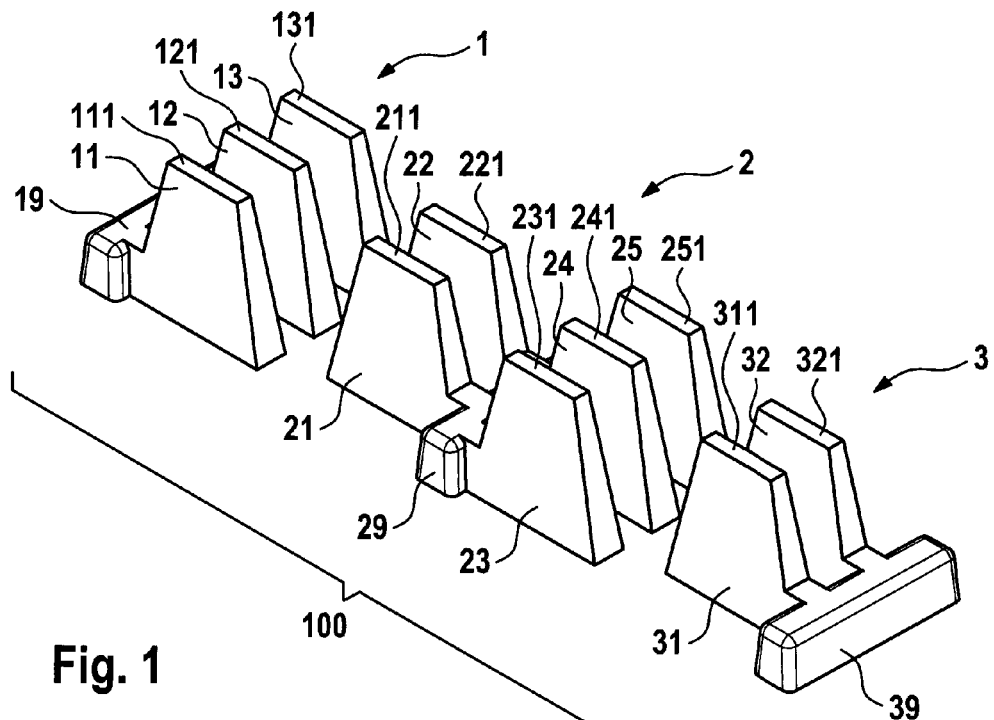
FIG. 1 shows an example of embodiment of an optical element for a vehicle headlight (head and lamp) or a motor vehicle headlight, respectively, by way of an exploded view.
Figure 2:
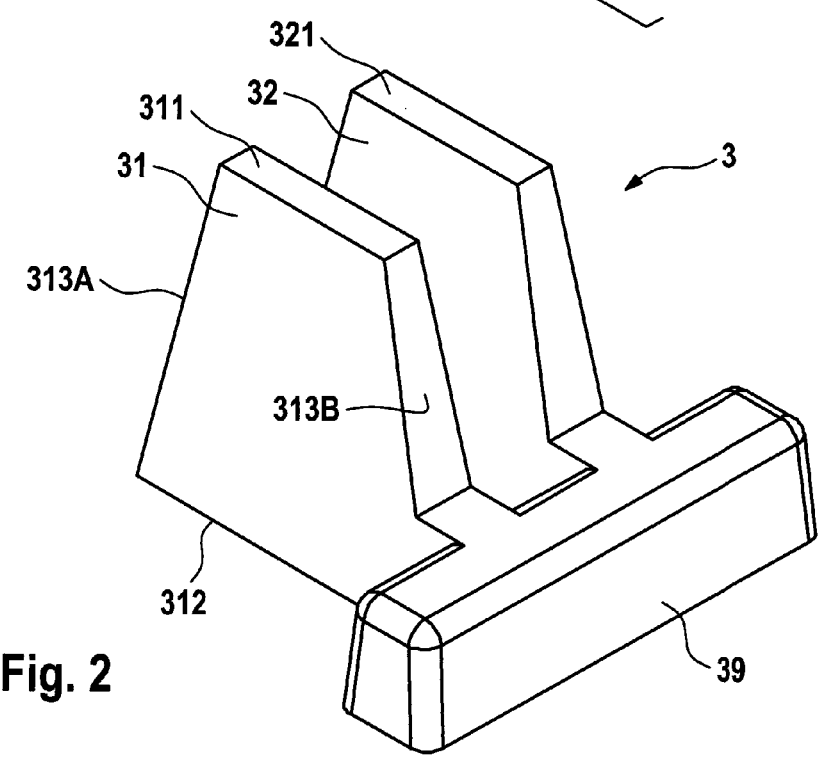
FIG. 2 shows an example of an embodiment of a monolithically pressed primary optic of inorganic glass.

FIG. 1 shows an optical element 100 for a vehicle headlight or a motor vehicle headlight, respectively. The optical element 100 comprises a monolithically pressed primary optic array 1 of inorganic glass, a monolithically pressed primary optic array 2 of inorganic glass, and a monolithically pressed primary optic array 3 of inorganic glass, with this array shown on a larger scale in FIG. 2. The primary optic array 1 comprises a web 19 on which a primary optic 11, a primary optic 12, and a primary optic 13 are arranged. The primary optic array 2 comprises a primary optic 21 and a primary optic 22 arranged on a web 29. Moreover, there are arranged, on an opposing side of the web 29, a primary optic 23, a primary optic 24, and a primary optic 25. The primary optic array 3 comprises a web 39, on which there are arranged a primary optic 31 and a primary optic 32.

Figure 3:
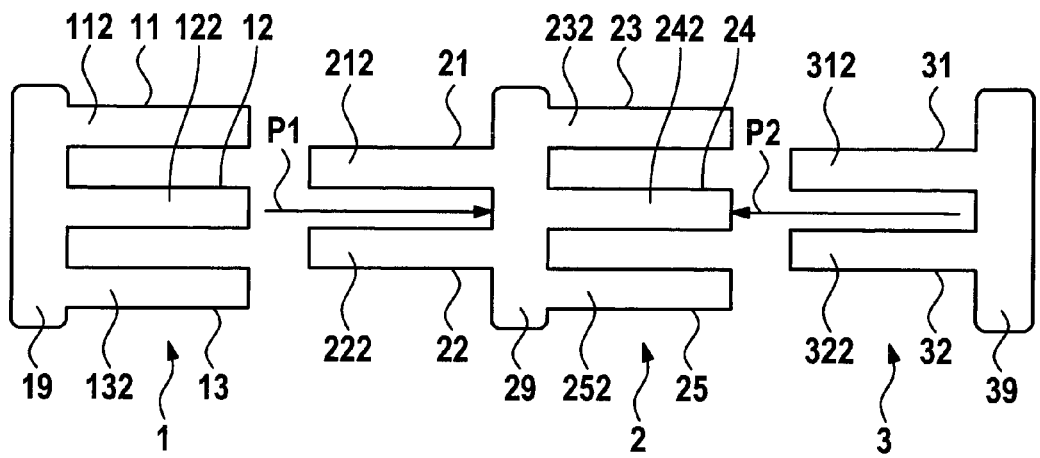
FIG. 3 shows a view of the optical element according to FIG. 1 from below.
Figure 4:
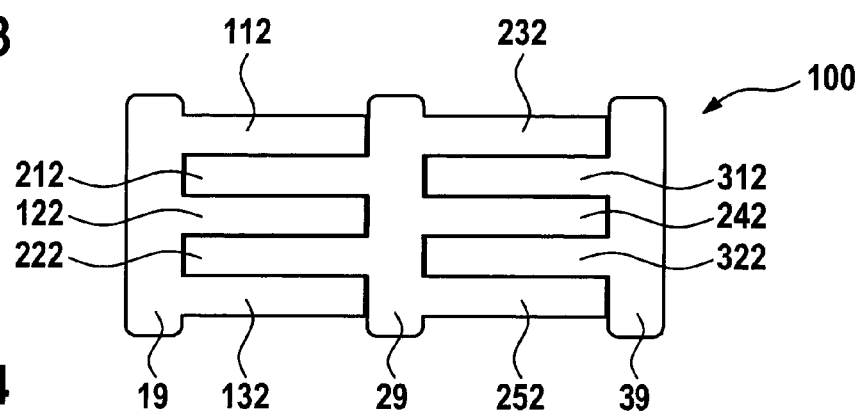
FIG. 4 shows the optical element according to FIG. 1 from below.
Figure 5:
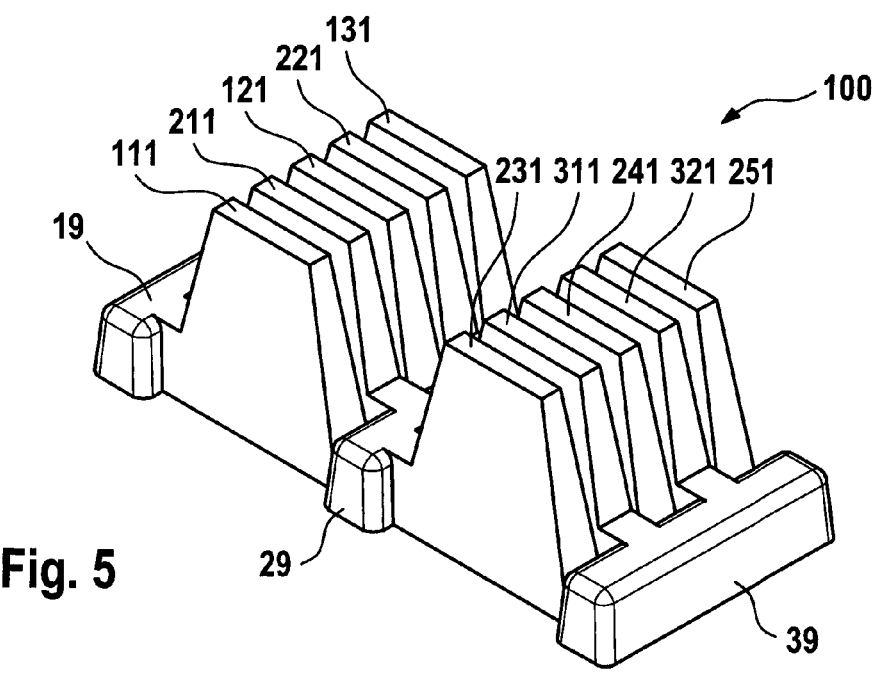
FIG. 5 shows the optical element according to FIG. 4 by way of a perspective top view.
Figure 6:
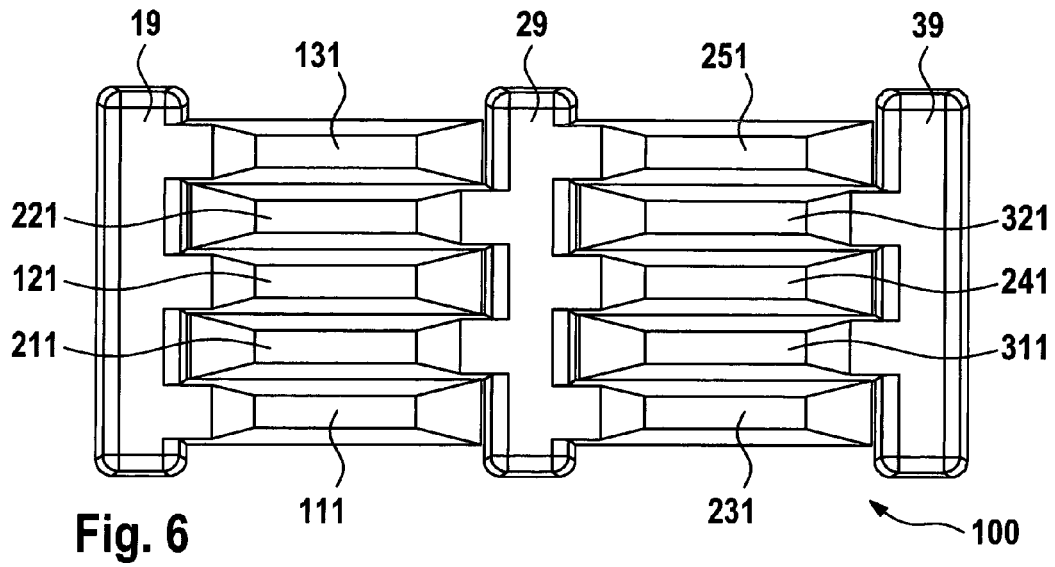
FIG. 6 shows the optical element according to FIG. 4 by way of a top view.
Figure 7:
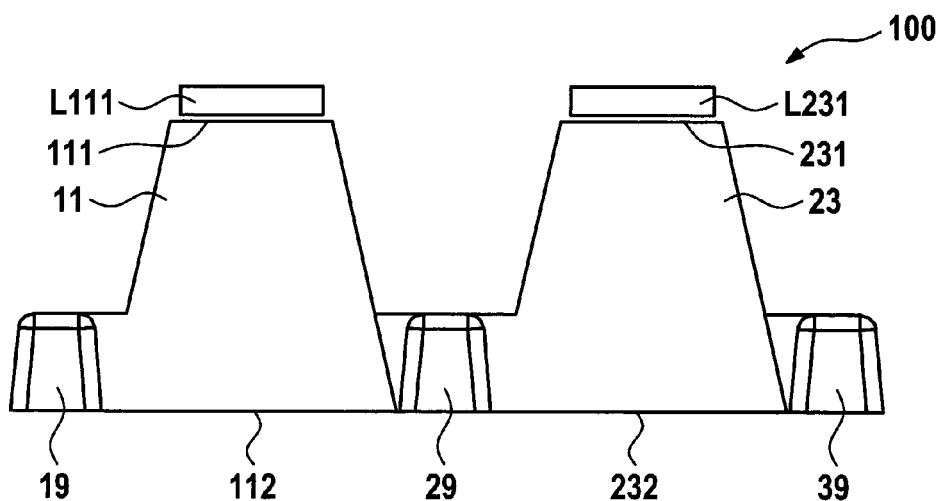
FIG. 7 shows the optical element according to FIG. 4 by way of a side view.
Figure 8:
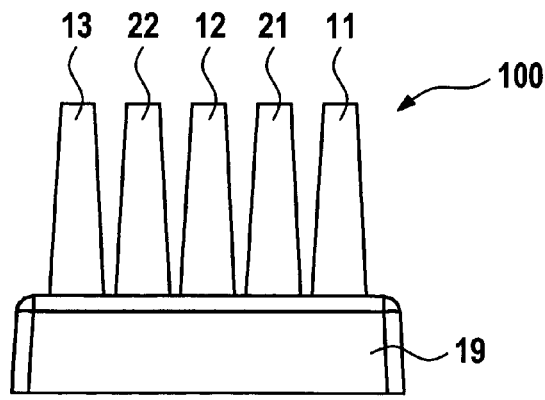
FIG. 8 shows the optical element according to FIG. 4 by way of a further side view.
Figure 9:
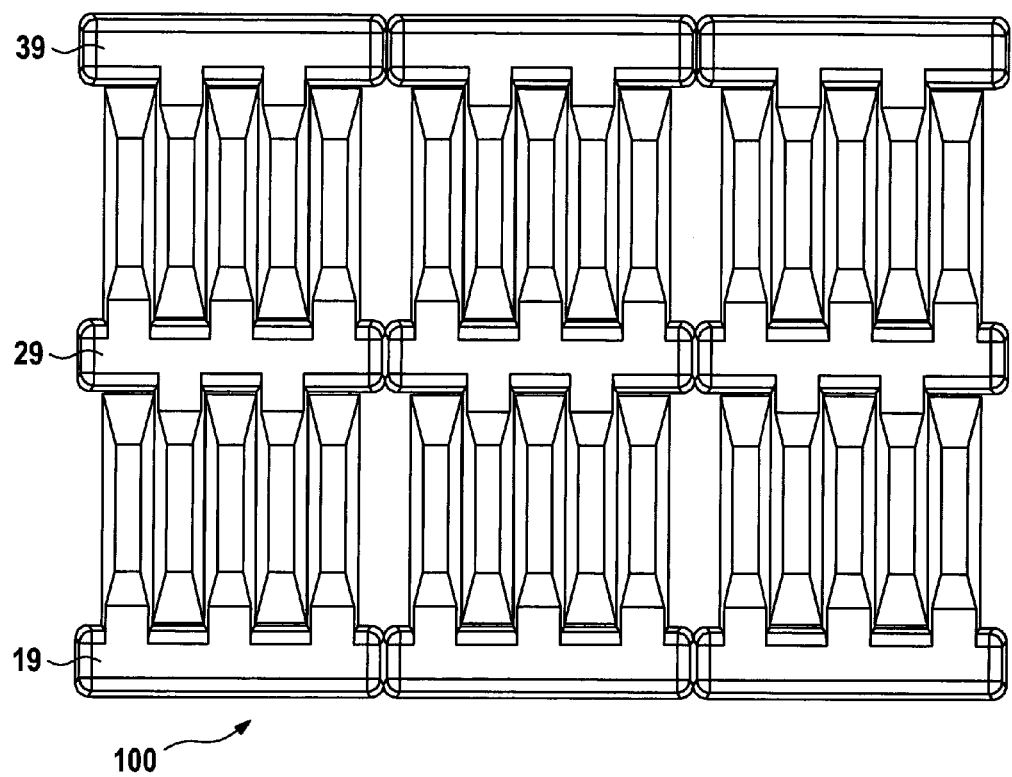
FIG. 9 shows a sequence or line-up of three optical elements according to the embodiment of the optical element corresponding to FIG. 4 by way of a top view.

FIG. 1 shows the optical element 100 by way of an exploded view. FIG. 3 shows the view of the optical element 100 according to FIG. 1 from below. Herein, arrows defined by reference numerals P1 and P2 show how the primary optic array 1 and the primary optic array 3 are slid into the primary optic array 2, in order to form the optical element 100 as has been represented, in its finished state, in FIGS. 4 and 5. Herein, FIG. 4 shows the optical element 100 by way of a view from below, whereas FIG. 5 shows the optical element 100 by way of a perspective top view. Herein, the primary optics 11, 21, 12, 22 and 13 form an array, and the primary optics 23, 31, 24, 32 and 25 form a further array. FIG. 6 shows the optical element 100 by way of a top view, and FIGS. 7 and 8 show the optical element 100 by way of a side elevation, wherein FIG. 7 shows a longitudinal side of the optical element 100, and FIG. 8 shows a narrow side of the optical element 100. It should be realised that, as has been represented by FIG. 9, several optical elements can be mounted together according to an embodiment of the optical element 100.

27.12.

The primary optic 11 comprises a light entry face 111 and a light exit face 112. The primary optic 12 comprises a light entry face 121 and a light exit face 122. The primary optic 13 comprises a light entry face 131 and a light exit face 132. The primary optic 21 comprises a light entry face 211 and a light exit face 212. The primary optic 22 comprises a light entry face 221 and a light exit face 222. The primary optic 23 comprises a light entry face 231 and a light exit face 232. The primary optic 24 comprises a light entry face 241 and a light exit face 242. The primary optic 25 comprises a light entry face 251 and a light exit face 252. The primary optic 31 comprises a light entry face 311 and a light exit face 312. The primary optic 32 comprises a light entry face 321 and a light exit face 322.

Figure 10:
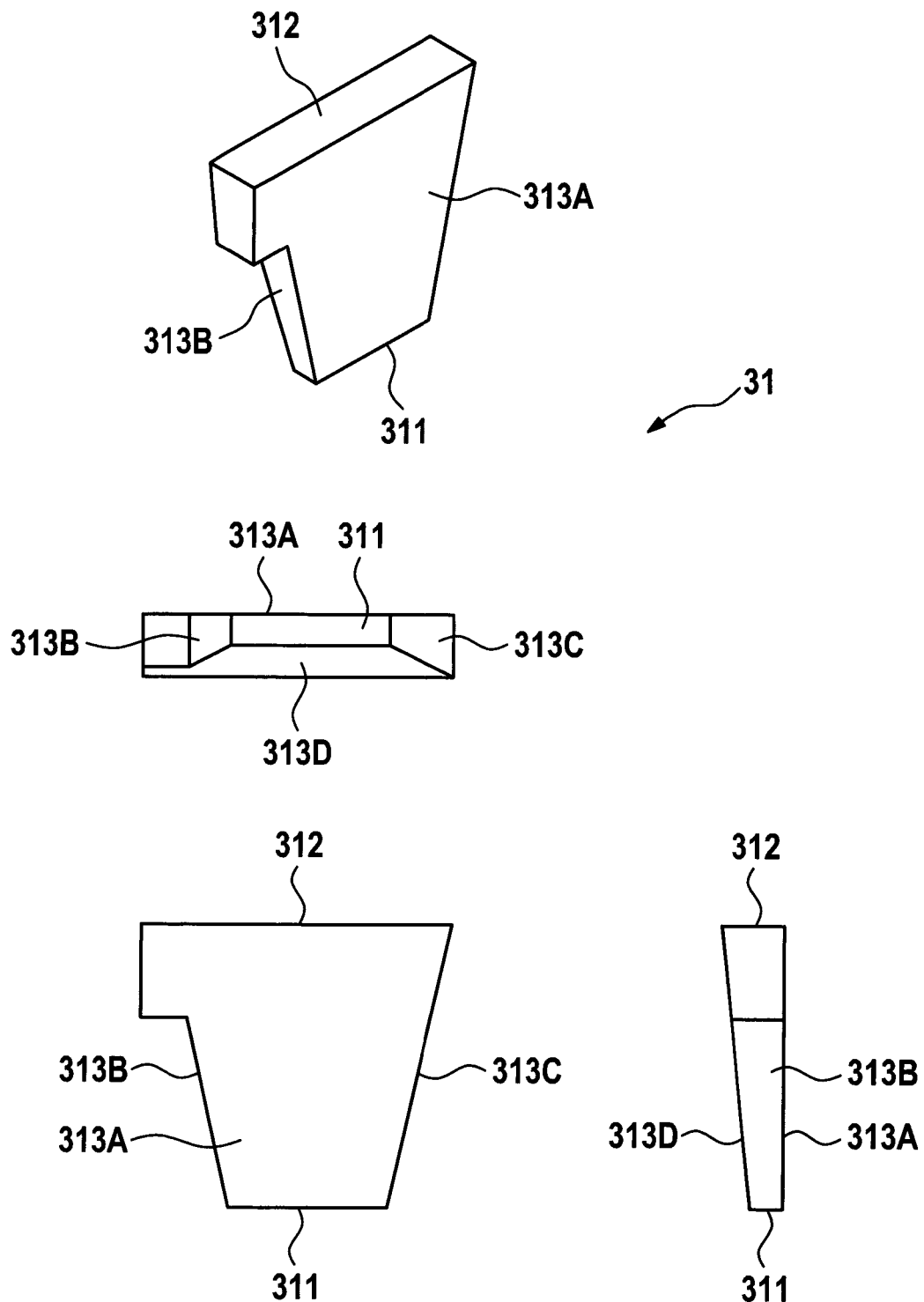
FIG. 10 shows different views of a primary optic of a primary optic array according to FIG. 2.

The primary optics 11, 12, 13, 21, 22, 23, 24, 25, 31, 32 are, for example, configured according to the representation of the primary optic 31 corresponding to FIG. 10, wherein FIG. 10 shows various perspectives of the primary optic 31. Between the light entry face 311 and the light exit face 312, the primary optic 31 comprises bright-molded side faces 313 A, 313 B, 313 C, and 313 D at which light which is irradiated through the light entry face 311 is subject to total reflection. The side faces 313 A, 313 B, 313 C, and 313 D are so-called TIR-faces.

For implementing a motor vehicle headlight, LEDs are associated with the light entry faces 111, 121, 131, 211, 221, 231, 241, 251, 311, 321, as, by way of example, has been represented in FIG. 7. Herein, reference numeral L111 designates an LED associated with the light entry face 111; by means of this LED, light is irradiated into the light entry face 111. Reference numeral L231 designates an LED. By means of this, light is irradiated into the light entry face 231. Corresponding LEDs are associated with the other light entry faces 121, 131, 211, 221, 241, 251, 311, 321, wherein there is particularly provided for that all of the LEDs or a part of the LEDs may be controlled separately or individually, respectively.

In an example of embodiment, the size of the LEDs is 1×4 mm. The light entry faces 111, 121, 131, 211, 221, 231, 241, 251, 311, 321 are 1.2×5 mm. The distance from the light entry face to the light exit face amounts to 10 mm. Herein, the distance of a primary optic of a primary optic array to a neighbouring primary optic of a primary optic array amounts to 0.1 mm. The distance between the primary optic 21 and the primary optic 12, for example, amounts to 0.1 mm. The distance between the primary optic 21 and the primary optic 12, for example, amounts to 0.1 mm. The distance between the primary optic 12 and the primary optic 22, for example, amounts to 0.1 mm. The distance between the primary optic 22 and the primary optic 13, for example, amounts to 0.1 mm. The distance between the primary optic 23 and the primary optic 31, for example, amounts to 0.1 mm. The distance between the primary optic 31 and the primary optic 24, for example, amounts to 0.1 mm. The distance between the primary optic 24 and the primary optic 32, for example, amounts to 0.1 mm. The distance between the primary optic 32 and the primary optic 25, for example, amounts to 0.1 mm.

Figure 11:
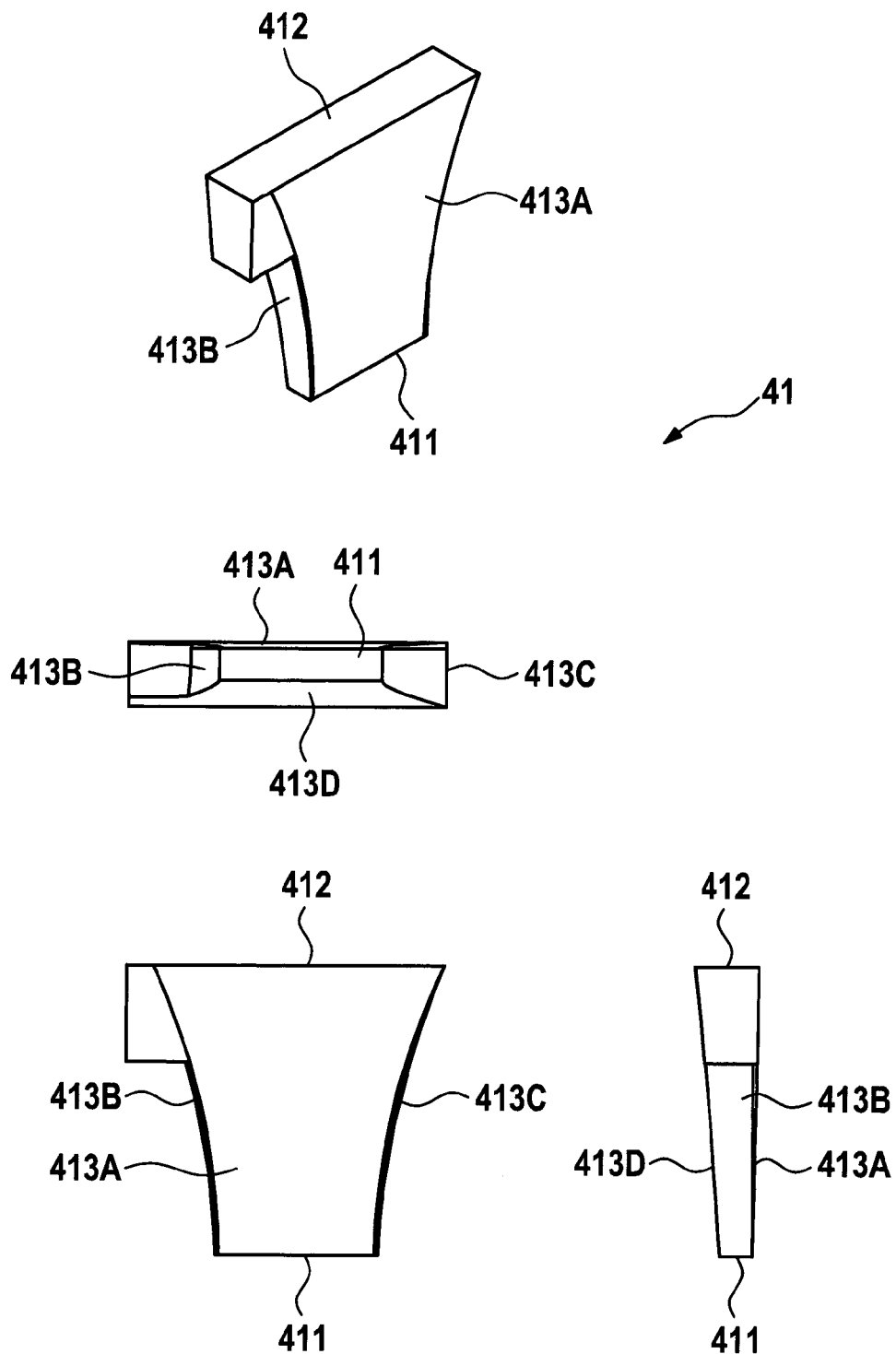
FIG. 11 shows different views of a further embodiment of a primary optic.

FIG. 11 shows—by way of various views—an example of embodiment of a primary optic 41 for an alternative use of the primary optic/s 11, 12, 13, 21, 22, 23, 24, 25, 31 and/or 32. The primary optic 41 comprises a light entry face 411 and a light exit face 412. Between the light entry face 411 and the light exit face 412, the primary optic 41 is restricted by a concavely curved, press-molded side face 413 A, by a concavely curved, press-molded side face 413 B, by a concavely curved, press-molded side face 413 C, and by a concavely curved, press-molded side face 413 D.

Figure 12:
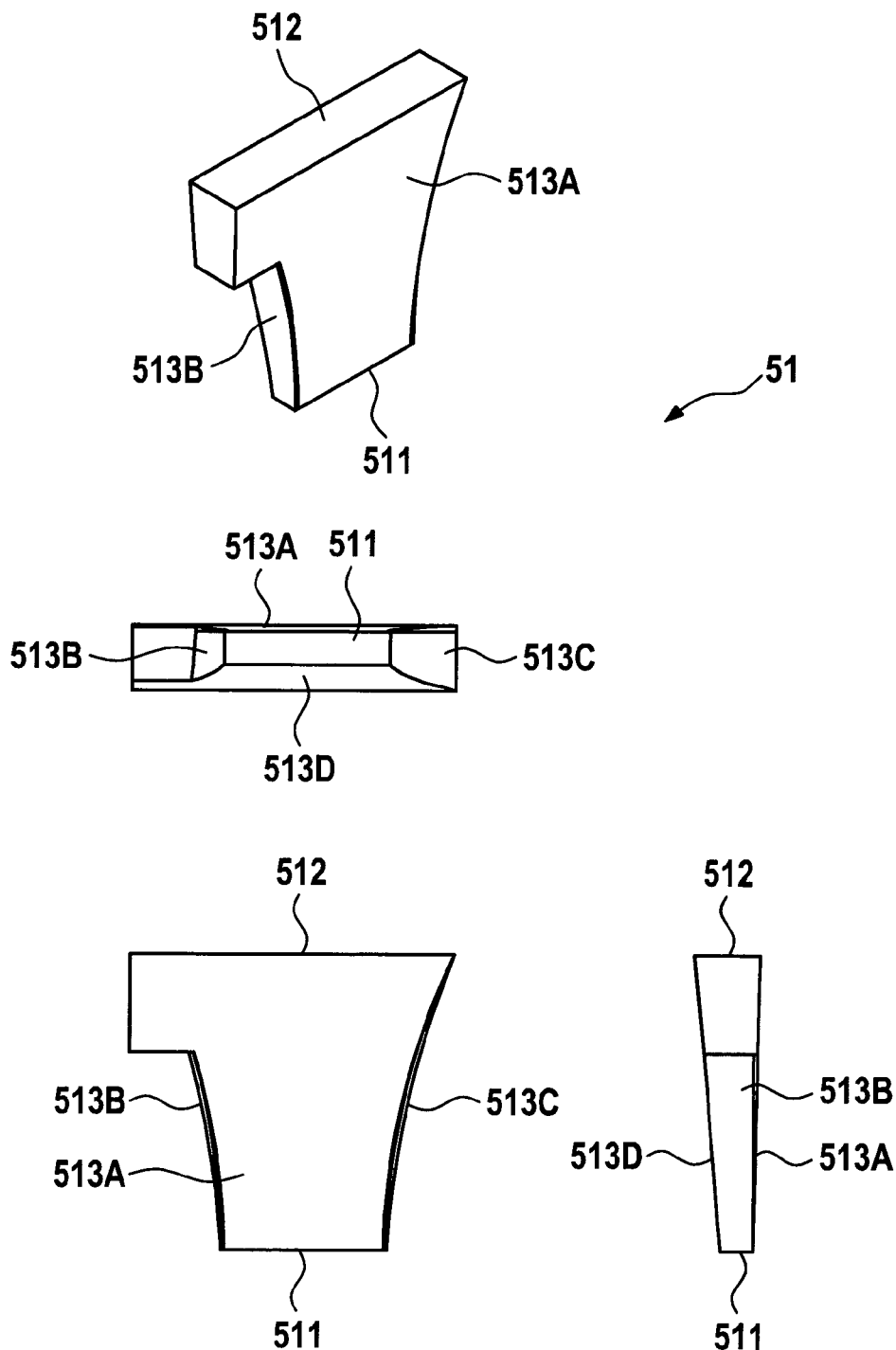
FIG. 12 shows different views of a further embodiment of a primary optic.

FIG. 12 shows—by way of various views—an example of embodiment of a primary optic 51 for an alternative use of the primary optic/s 11, 12, 13, 21, 22, 23, 24, 25, 31 and/or 32. The primary optic 51 comprises a light entry face 511 and a light exit face 512. Between the light entry face 511 and the light exit face 512, the primary optic 51 is restricted by a plainly press-molded side face 513 A, by a concavely curved, press-molded side face 513 B, by a concavely curved, press-molded side face 513 C, and by a plainly press-molded side face 513 D.

Figure 13:
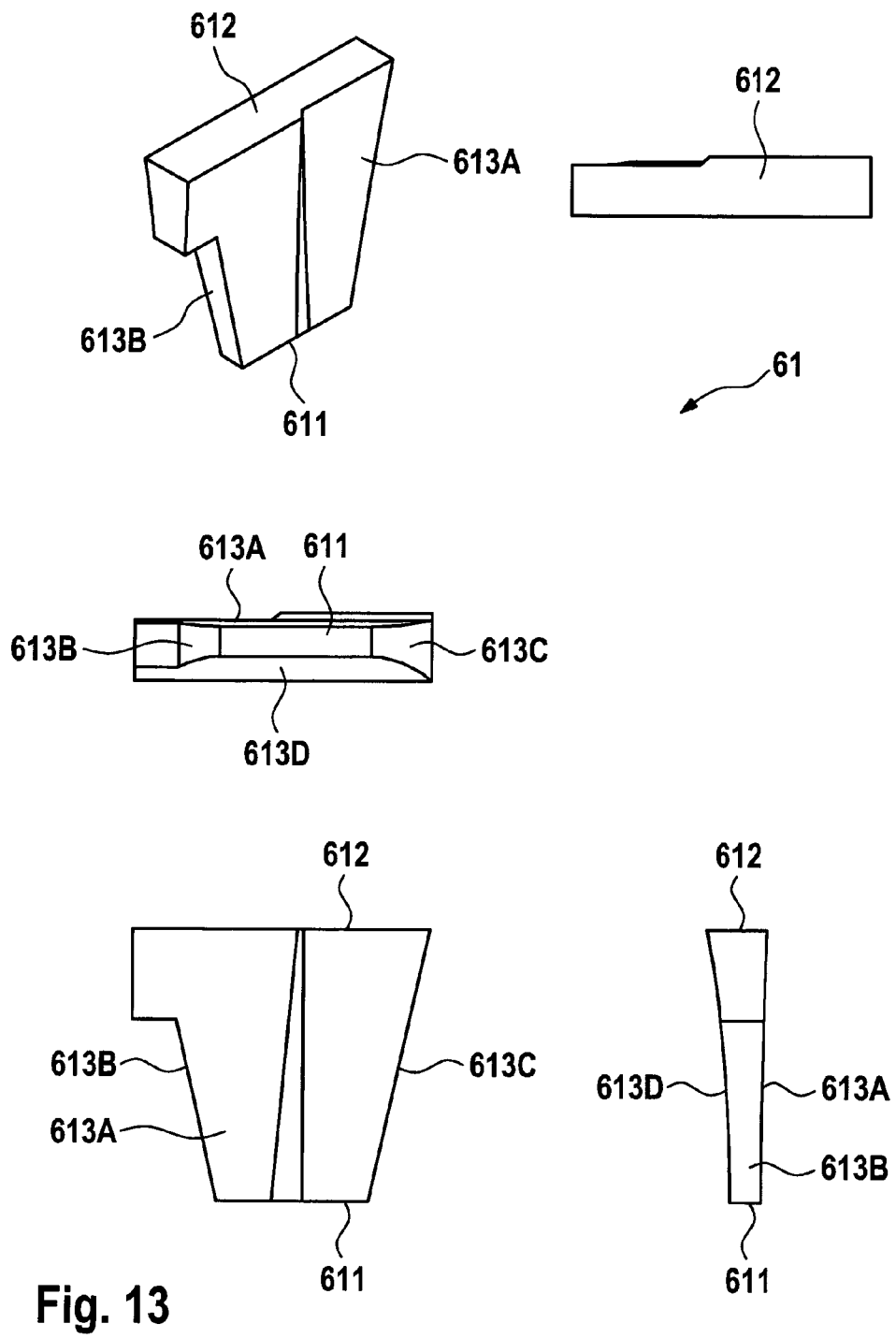
FIG. 13 shows different views of a further embodiment of a primary optic.

FIG. 13 shows—by way of various views—an example of embodiment of a primary optic 61 for an alternative use of the primary optic/s 11, 12, 13, 21, 22, 23, 24, 25, 31 and/or 32. The primary optic 61 comprises a light entry face 611 and a light exit face 612. Between the light entry face 611 and the light exit face 612, the primary optic 61 is restricted by a concavely curved, press-molded side face 613 A, by a plainly press-molded side face 613 B, by a plainly press-molded side face 613 C, and by a concavely curved, press-molded side face 613 D.

Figure 14:
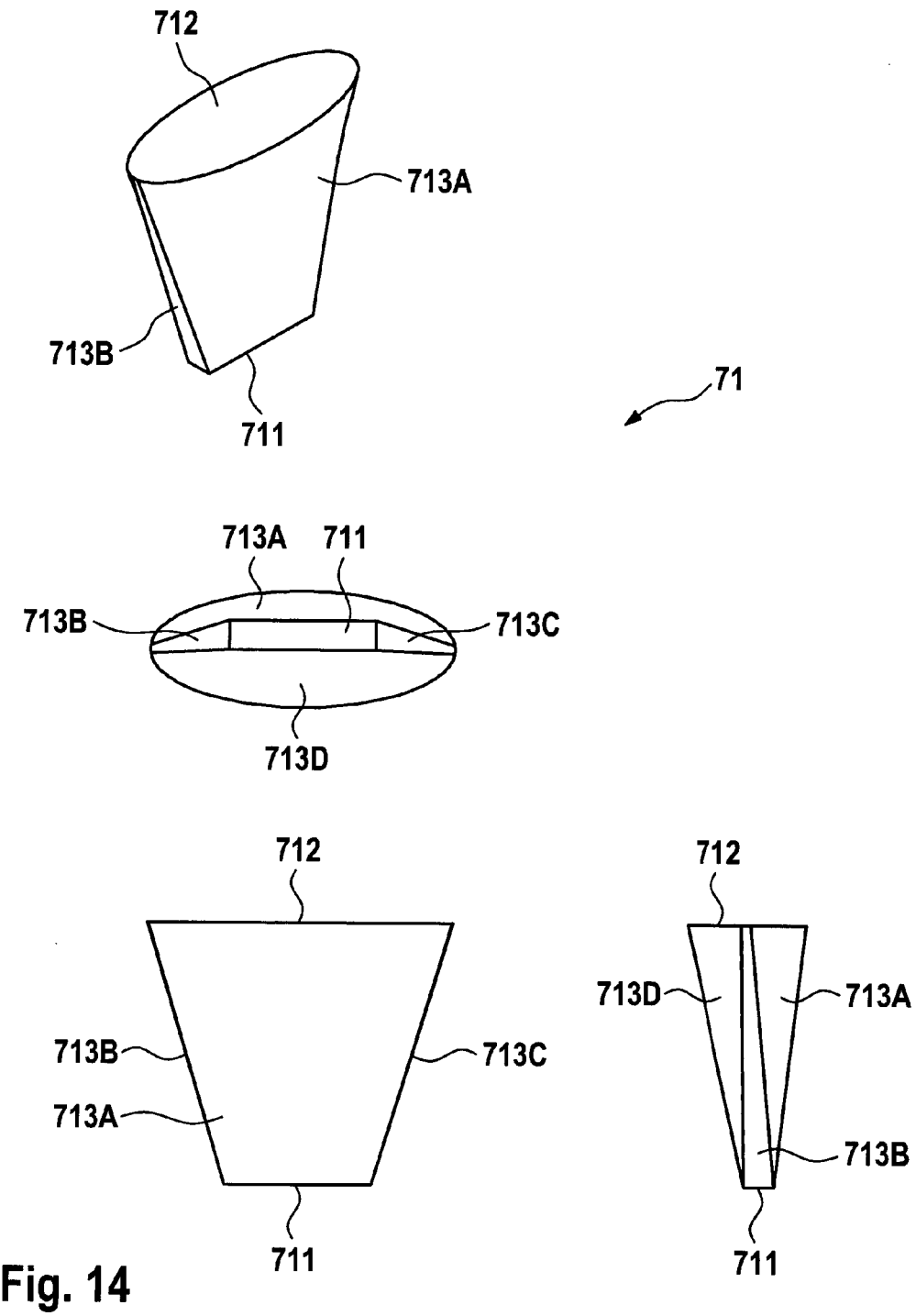
FIG. 14 shows different views of a further embodiment of a primary optic.

FIG. 14 shows—by way of various views—an example of embodiment of a primary optic 71 for an alternative use of the primary optic/s 11, 12, 13, 21, 22, 23, 24, 25, 31 and/or 32. The primary optic 71 comprises a light entry face 711 and a light exit face 712. Between the light entry face 711 and the light exit face 712, the primary optic 71 is restricted by a convexly curved, press-molded side face 713 A, by a plainly press-molded side face 713 B, by a plainly press-molded side face 713 C, and by a convexly curved, press-molded side face 713 D.

Figure 15:
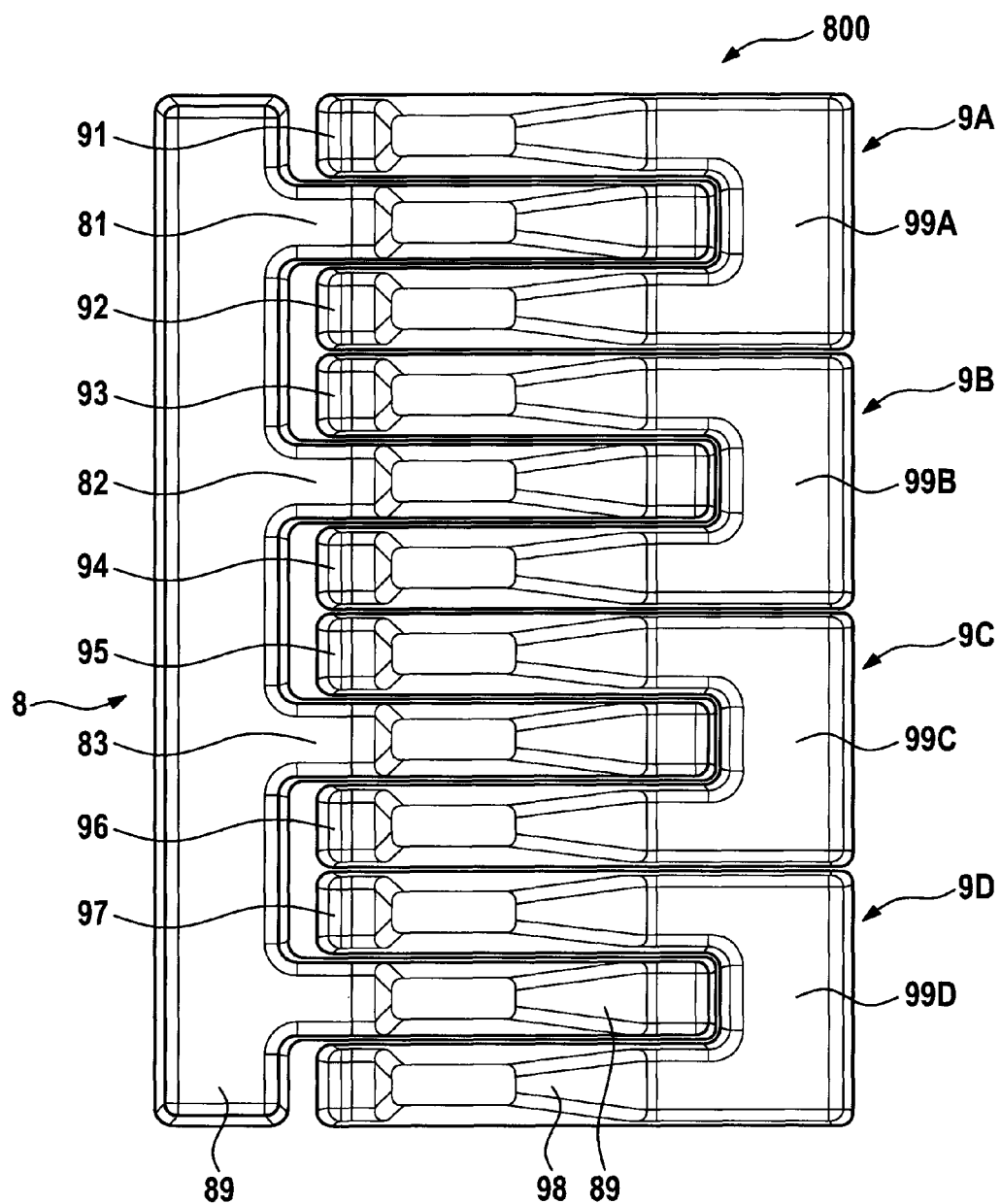
FIG. 15 shows an example of embodiment of an optical element for a vehicle headlight or a motor vehicle headlight, respectively, by way of a top view and configured alternatively to the optical element according to FIG. 1.

FIG. 15 shows and alternatively configured optical element 800 for a vehicle headlight or a motor vehicle headlight, respectively, by way of a top view. The optical element 800 comprises a monolithically pressed primary optic array 8 of inorganic glass, a monolithically pressed primary optic array 9A of an organic glass, a monolithically pressed primary optic array 9C of inorganic glass, and a monolithically pressed primary optic array 9D of inorganic glass. The primary optic array 8 comprises a web 89, on which there are arranged a primary optic 81, a primary optic 82, a primary optic 83, and a primary optic 84. The primary optic array 9A comprises a primary optic 91 and a primary optic 92, which are arranged on a web 99A. The primary optic array 9B comprises a primary optic 93 and a primary optic 94, which are arranged on a web 99B. The primary optic array 9C comprises a primary optic 95 and a primary optic 96, which are arranged on a web 99C. The primary optic 9D comprises a primary optic 97 and a primary optic 98, which are arranged on a web 99D. Herein, the primary optics 91, 81, 92, 93, 82, 94, 95, 83, 96, 97, 84, and 98 are arranged with respect to each other such that they form an array, in which the primary optic 81 is arranged between the primary optics 91 and 92, in which the primary optic 82 is arranged between the primary optics 93 and 94, in which the primary optic 83 is arranged between the primary optics 95 and 96, in which the primary optic 84 is arranged between the primary optics 97 and 98, in which the primary optics 92 and 93 are arranged between the primary optics 81 and 82, in which the primary optics 94 and 95 are arranged between the primary optics 82 and 83, and in which the primary optics 96 and 97 are arranged between the primary optics 83 and 84.

Figure 16:
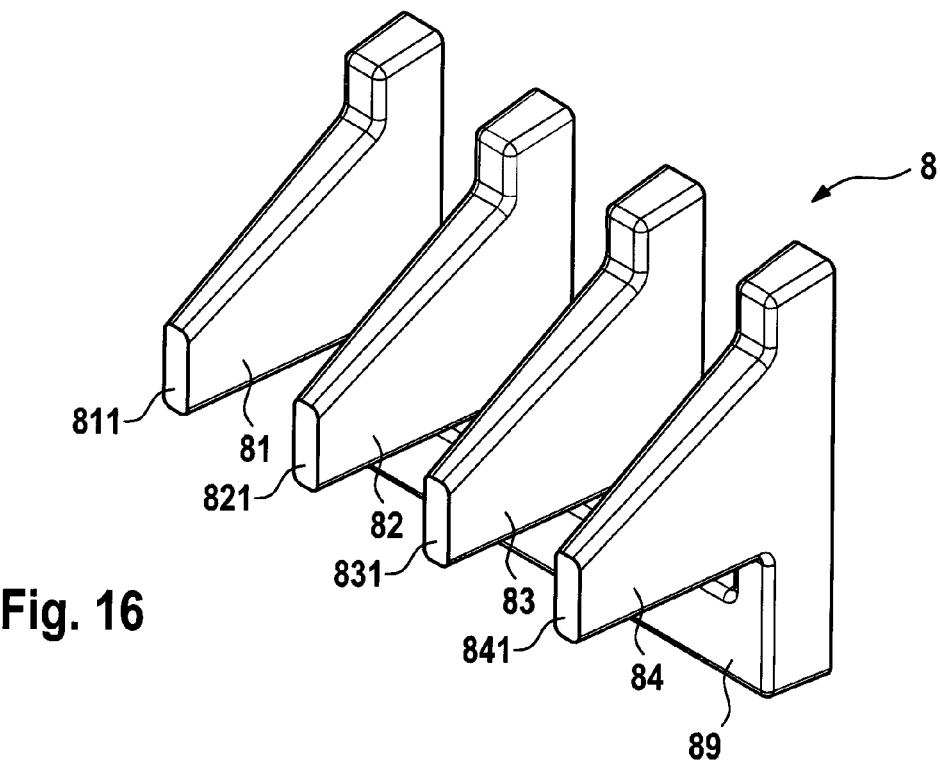
FIG. 16 shows a perspective representation of a primary optic array of the optical element according to FIG. 15.
Figure 17:
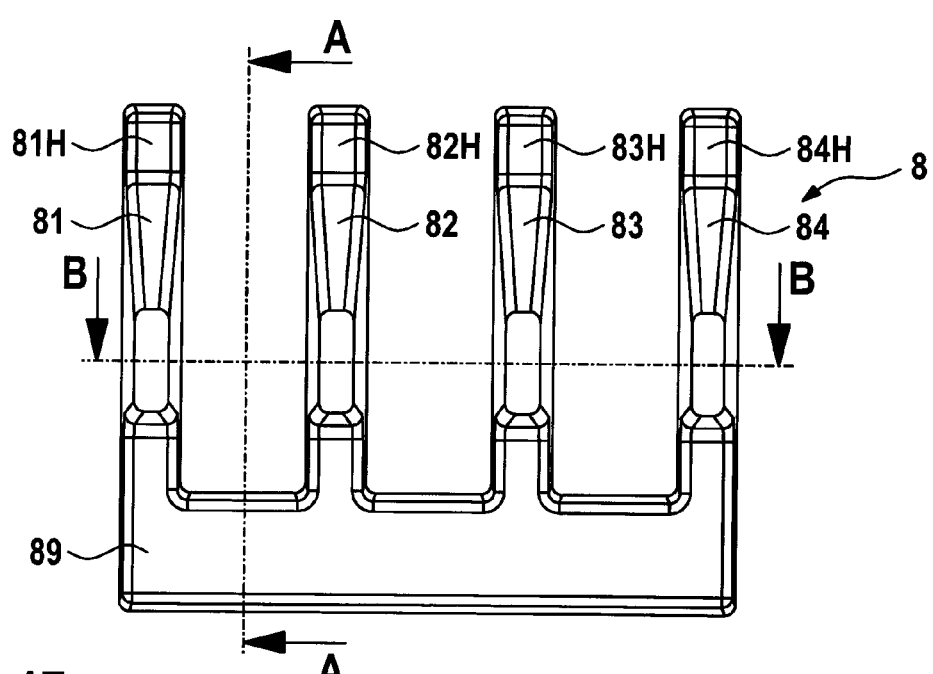
FIG. 17 shows the primary optic array according to FIG. 16 by way of a top view.
Figure 18:
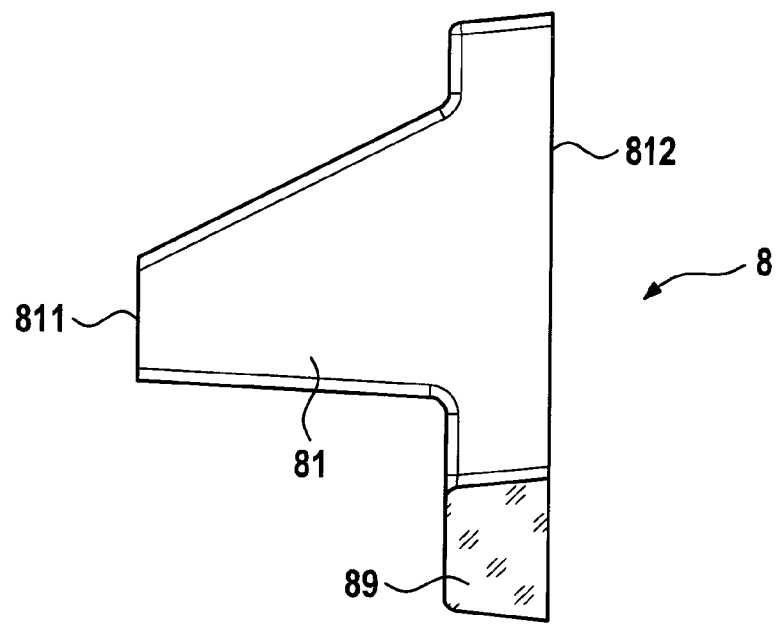
FIG. 18 shows the primary optic array according to FIG. 16 by way of cross-sectional representation along a section line A-A as represented in FIG. 17.
Figure 19:
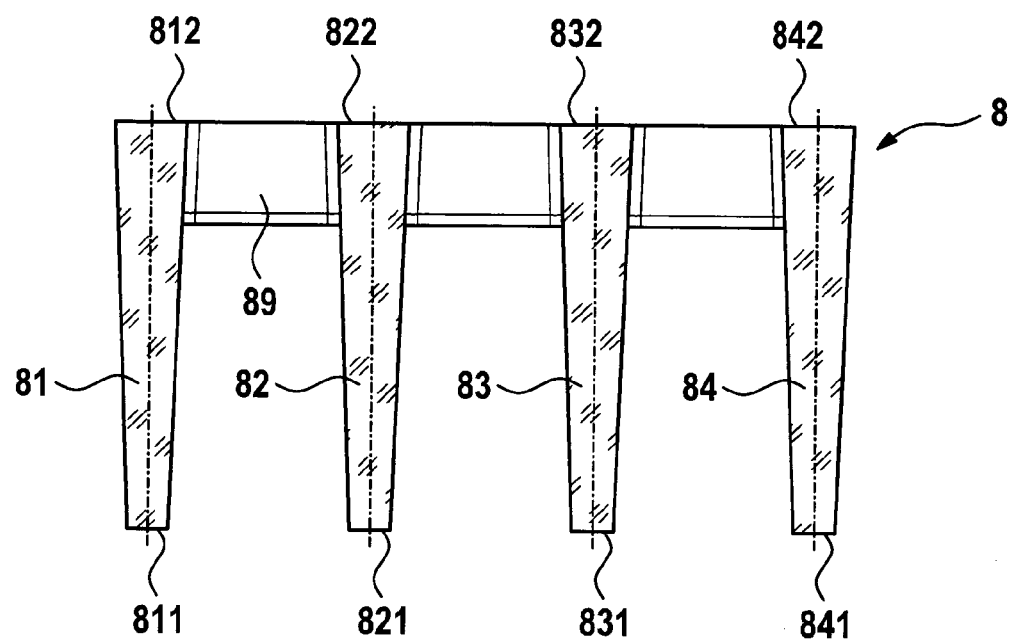
FIG. 19 shows the primary optic array according to FIG. 16, by way of a cross-section taken along section line B-B as shown in FIG. 17.

FIG. 16 shows the primary optic array 8 by way of a perspective representation. FIG. 17 shows the primary optic array 8 by way of a top view. FIG. 18 shows the primary optic array 8 by way of a cross sectional representation along the sectional line A-A represented in FIG. 17, and FIG. 19 shows the primary optic array 8 by way of a cross sectional representation along the sectional line B-B represented in FIG. 17. The primary optic 81 comprises a light entry face 811 and a light exit face 812. The primary optic 82 comprises a light entry face 821 and a light exit face 822. The primary optic 83 comprises a light entry face 831 and a light exit face 832. The primary optic 84 comprises a light entry face 841 and a light exit face 842.

Figure 20:
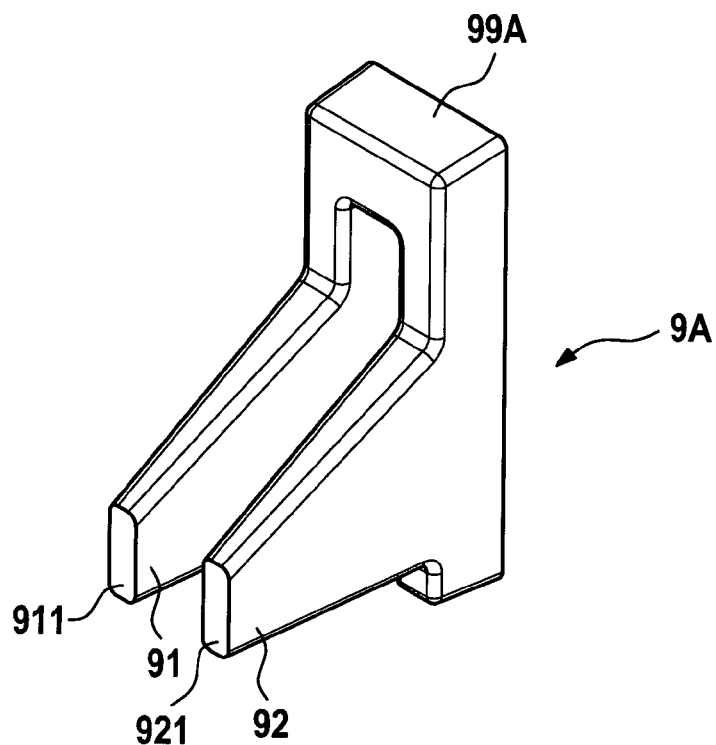
FIG. 20 shows a perspective representation of a further primary optic array of the optical element according to FIG. 15.
Figure 21:
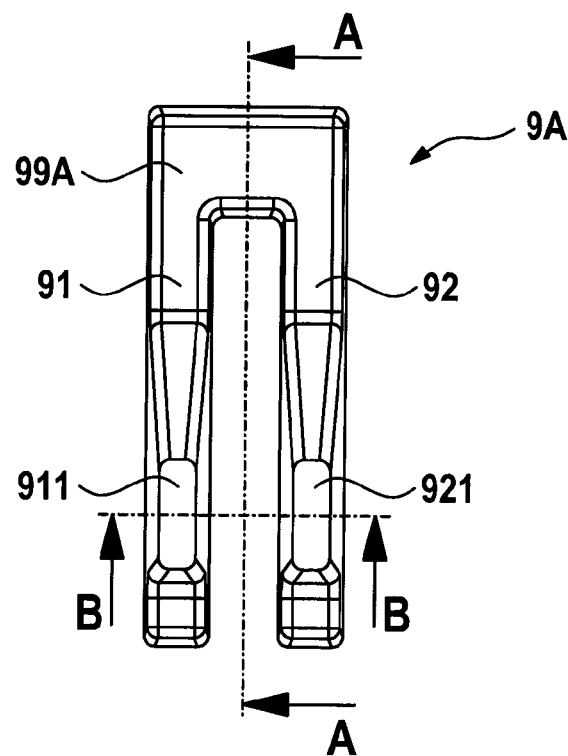
FIG. 21 shows the primary optic array according to FIG. 20 by way of a top view.
Figure 22:
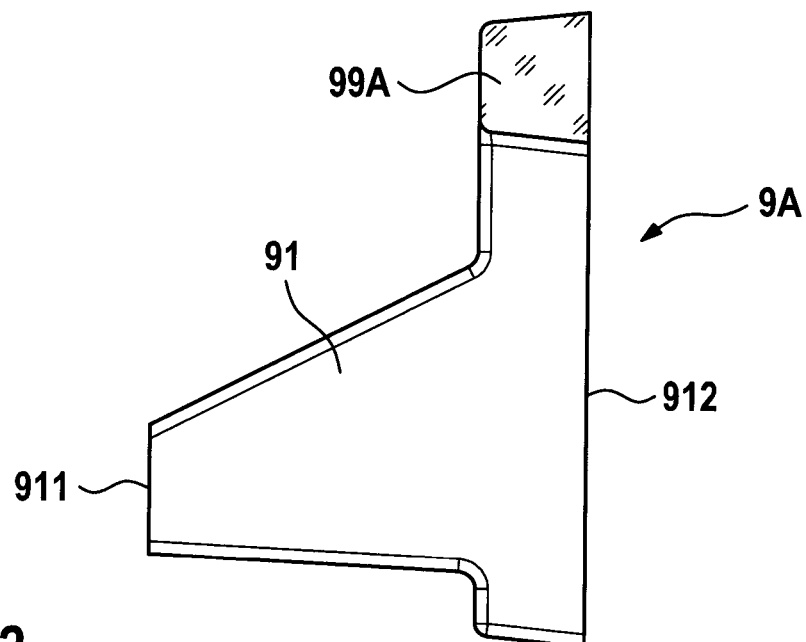
FIG. 22 shows the primary optic array according to FIG. 20 by way of a cross-sectional representation along section line A-A as represented in FIG. 21.
Figure 23:
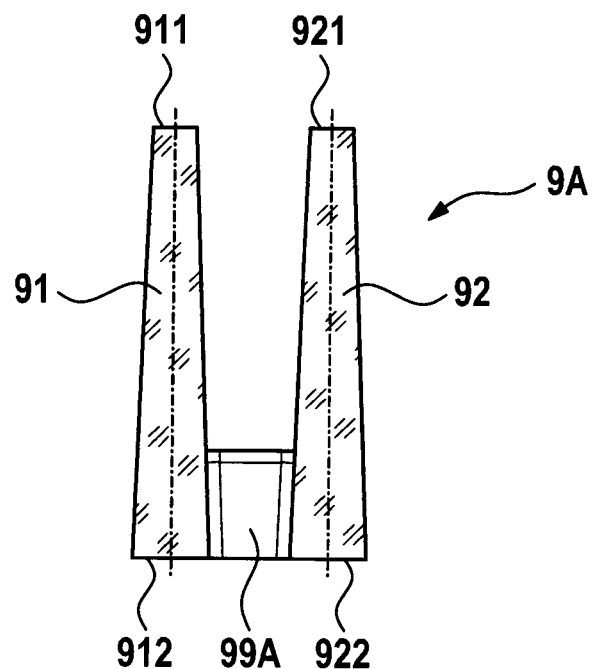
FIG. 23 shows the primary optic array according to FIG. 20 by way of a cross-sectional representation taken along a section line B-B as represented in FIG. 21.

FIG. 20 shows the primary optic array 9A by way of a perspective representation. FIG. 21 shows the primary optic array 9A by way of a top view. FIG. 22 shows the primary optic array 9A by way of a cross sectional representation along the sectional line A-A represented in FIG. 21, and FIG. 23 shows the primary optic array 9A by way of a cross sectional representation along the sectional line B-B represented in FIG. 21. The primary optic 91 comprises a light entry face 911 and a light exit face 912, and the primary optic 92 comprises a light entry face 921 and a light exit face 922. The primary optic arrays 9B, 9C, and 9D are configured particularly in analogy to the primary optic array 9A.

It is also possible to configure the primary optics 91, 81, 92, 93, 82, 94, 95, 83, 96, 97, 84, 98 in accordance with the primary optics 11, 41, 51, 61, and/or 71.

On their sides facing away from the web 89 the primary optics 81, 82, 83, 84 have supporting webs 81H, 82H, 83A, 84H. In the shown example of embodiment the thicknesses of the supporting webs 81H, 82H, 83A, 84H are equal to the thickness of the web 89. However, it is also considered possible that the thicknesses of the supporting webs 81H, 82H, 83A, 84H differ from the thickness of the web 89. In the respective sense, thickness is, in particular, the extension of a web or of a supporting web, respectively, seen in the direction of the optical axis of a primary optic.

Figure 24:
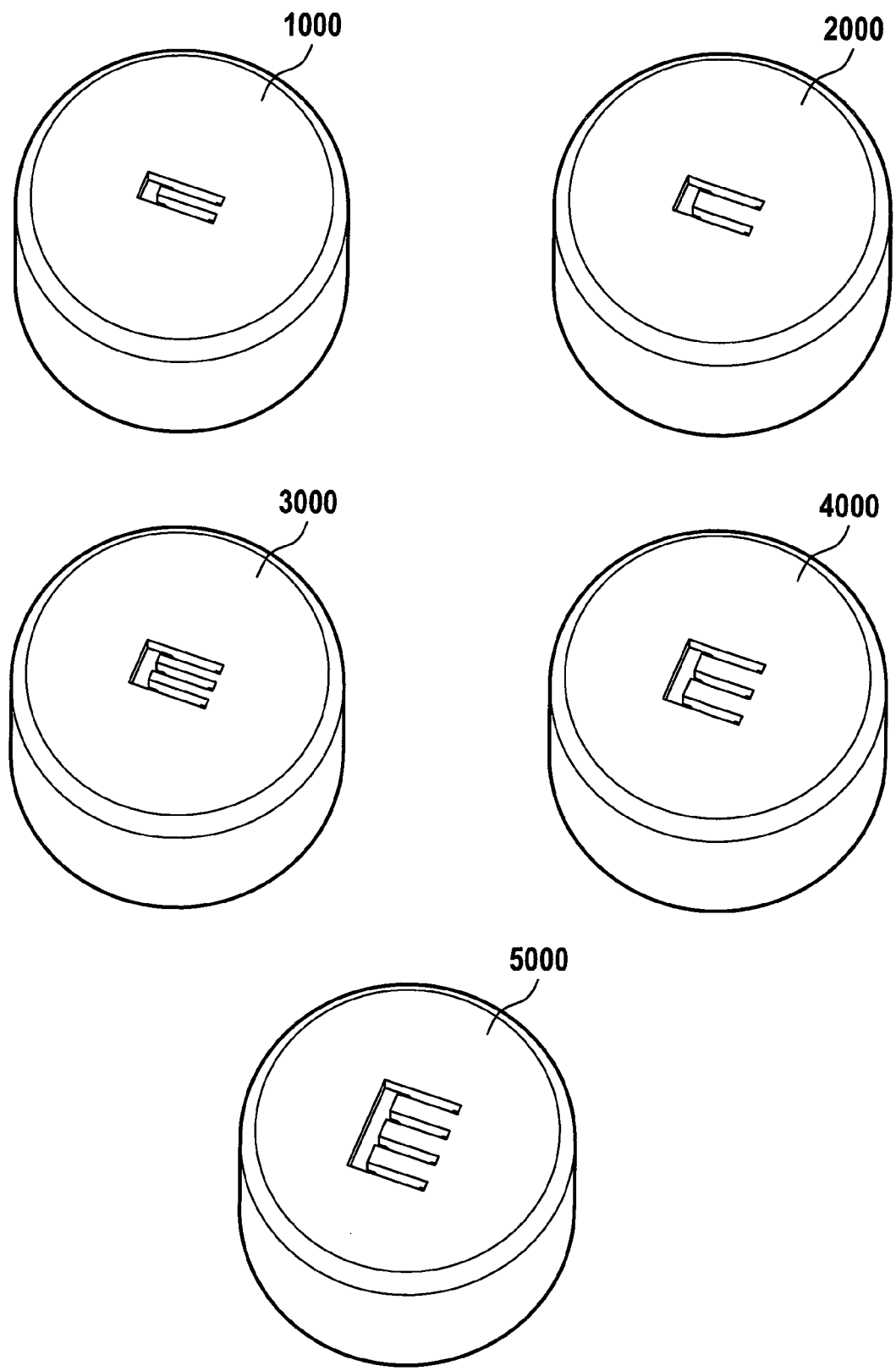
FIG. 24 shows an example of embodiment of a group of mold sets or kits of different type.
Figure 28:
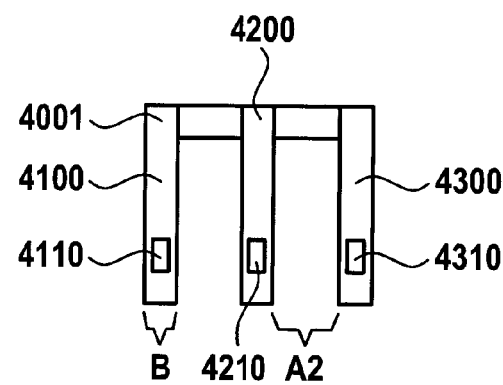
FIG. 28 shows a further example of embodiment of a primary optic array.
Figure 29:
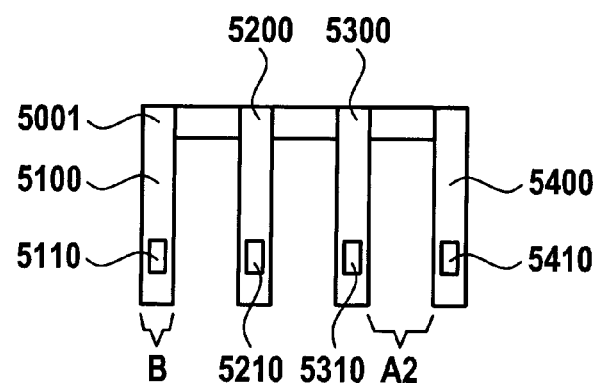
FIG. 29 shows a further example of embodiment of a primary optic array.

In an appropriate method for manufacturing optical elements for vehicle headlights, in particular for motor vehicle headlights, several different mold sets or kits are made available, as has, for example, been represented in FIG. 24. In this context, FIG. 24 shows a mold 1000, by means of which, in connection with a pressing bottom (pressing base, pressing floor plate or lower pressing plate), a primary optic array 1001 as shown in FIG. 25 can be pressed; further a mold 2000, by means of which, in connection with a pressing bottom (pressing base etc.), a primary optic array 2001, as shown in FIG. 26, can be pressed; a mold 3000, by means of which, in connection with a pressing bottom (pressing base etc.), a primary optic array 3001 as represented in FIG. 27 can be pressed; a mold 4000, by means of which, in connection with a pressing bottom (pressing base etc.), a primary optic array 4001, as represented in FIG. 28, can be pressed; as well as a mold 5000, by means of which, in connection with a pressing bottom (pressing base etc.), a primary optic array 5001, as represented in FIG. 29, can be pressed.

Figure 25:
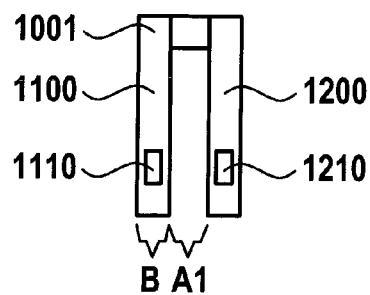
FIG. 25 shows an example of embodiment of a primary optic array.

The monolithic (for example partially press-molded) primary optic array 1001 of inorganic glass—represented in FIG. 25—comprises a primary optic 1100 having a light entry face 1110, and a primary optic 1200 having a light entry face 1210. The distance A1 between the primary optic 1100 and the primary optic 1200 is equal to their width B plus 0.2 mm. The primary optic arrays 9A, 9B, 9C, and 9D are detailed examples of embodiment for possible optional configuration of the primary optic array 1001.

Figure 26:
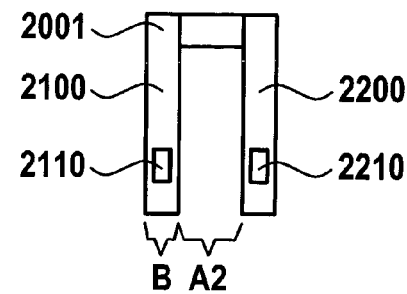
FIG. 26 shows a further example of embodiment of a primary optic array.

The monolithic (for example partially press-molded) primary optic array 2001 of inorganic glass—represented in FIG. 26—comprises a primary optic 2100 having a light entry face 2110, and a primary optic 2200 having a light entry face 2210. The distance A2 between the primary optic 2100 and the primary optic 2200 is equal to double their width B plus 0.3 mm.

Figure 27:
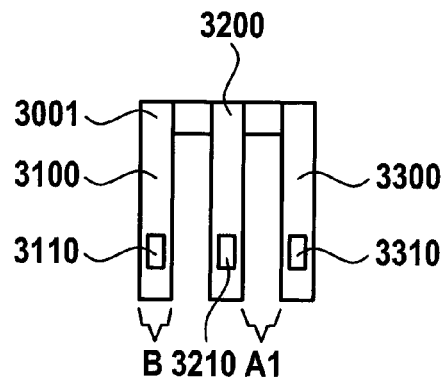
FIG. 27 shows a further example of embodiment of a primary optic array.

The monolithic (for example partially press-molded) primary optic array 3001 of inorganic glass—represented in FIG. 27—comprises a primary optic 3100 having a light entry face 3110, a primary optic 3200 having a light entry face 3210, and a primary optic 3300 having a light entry face 3310. The distance A1 between the primary optic 3100 and the primary optic 3200 as well as between the primary optic 3200 and the primary optic 3300 is equal to their width B plus 0.2 mm.

The monolithic (for example partially press-molded) primary optic array 4001 of inorganic glass—represented in FIG. 28—comprises a primary optic 4100 having a light entry face 4110, a primary optic 4200 having a light entry face 4210, and a primary optic 4300 having a light entry face 4310. The distance A2 between the primary optic 4100 and the primary optic 4200 as well as between the primary optic 4200 and the primary optic 4300 is equal to double their width B plus 0.3 mm.

The monolithic (for example partially press-molded) primary optic array 5001 of inorganic glass—represented in FIG. 29—comprises a primary optic 5100 having a light entry face 5110, a primary optic 5200 having a light entry face 5210, a primary optic 5300 having a light entry face 5310, and a primary optic 5400 having a light entry face 5410. The distance A2 between the primary optic 5100 and the primary optic 5200, between the primary optic 5200 and the primary optic 5300, as well as between the primary optic 5300 and the primary optic 5400 is equal to double their width B plus 0.3 mm. The primary optic array 8 is a possible detailed example of embodiment of a primary optic array 5001.

Figure 30:
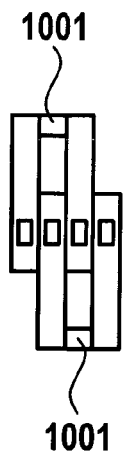
FIG. 30 shows an example of embodiment of an optical element configured as an array comprising four primary optics.

In order to manufacture an optical element as an array having four primary optics, two primary optic arrays 1001 are press-molded (bright-pressed) by means of the mold 1000, and they are slid into each other, as has been shown in FIG. 30.

Figure 31:
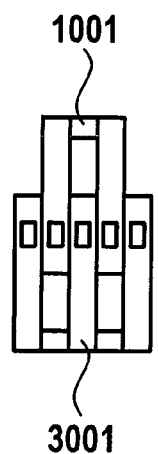
FIG. 31 shows an example of embodiment of an optical element configured as an array comprising five primary optics.

In order to manufacture an optical element as an array comprising five primary optics, a primary optic array 1001 and a primary optic array 3001 are press-molded by means of the mold 1000 and by means of the mold 3000, respectively. Subsequently, the primary optic array 1001 and the primary optic array 3001, respectively, are slid into each other, as has been represented in FIG. 31.

Figure 32:
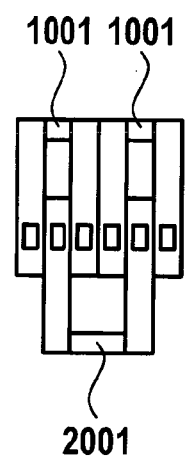
FIG. 32 shows an example of embodiment of an optical element configured as an array comprising six primary optics.

In order to manufacture an optical element as an array comprising six primary optics, two primary optic arrays 1001 and one primary optic array 2001 are pressed or press-molded, respectively, by means of the mold 1000 and by means of the mold 2000, respectively. Subsequently, the primary optic arrays 1001 are slid into the primary optic array 2001, as has been represented in FIG. 32.

Figure 33:
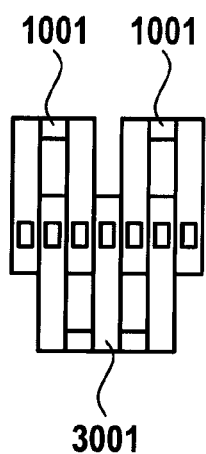
FIG. 33 shows an example of embodiment of an optical element configured as an array comprising seven primary optics.

In order to manufacture an optical element as an array comprising seven primary optics, two primary optic arrays 1001 and one primary optic array 3001 are pressed or press-molded, respectively, by means of the mold 1000 and by means of the mold 3000, respectively. Subsequently, the primary optic arrays 1001 are slid into the primary optic array 3001, as has been represented in FIG. 33.

Figure 34:
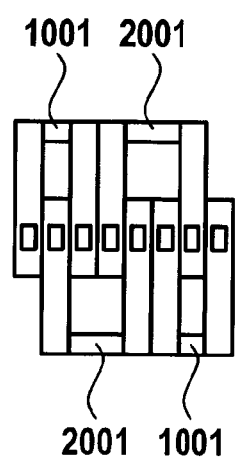
FIG. 34 shows an example of embodiment of an optical element configured as an array comprising eight primary optics.

In order to manufacture an optical element as an array comprising eight primary optics, two primary optic arrays 1001 and two and primary optic arrays 2001 are pressed or press-molded, respectively, by means of the mold 1000 and by means of the mold 2000, respectively. Subsequently, one primary optic array 1001, together with one primary optic array 2001, is slid into one primary optic array 2001 and one primary optic array 1001, as has been represented in FIG. 34.

Figure 35:
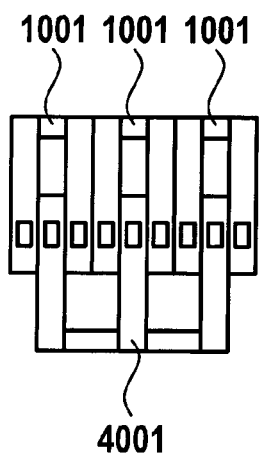
FIG. 35 shows an example of embodiment of an optical element configured as an array comprising nine primary optics.

In order to manufacture an optical element as an array comprising nine primary optics, three primary optics 1001 and one primary optic 4000 are pressed or press-molded, respectively, by means of the mold 1000. Subsequently, the primary optics 1001 are slid into the primary optic array 4001, as has been represented in FIG. 35.

Figure 36:
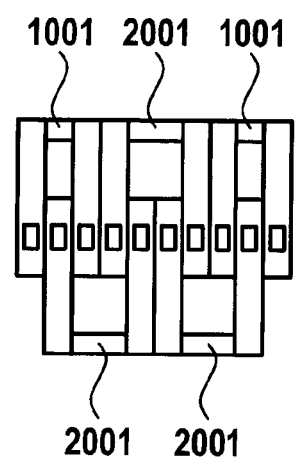
FIG. 36 shows an example of embodiment of an optical element configured as an array comprising ten primary optics.

In order to manufacture an optical element as an array comprising ten primary optics, two primary optic arrays 1001 are pressed or press-molded, respectively, by means of the mold 1000. Moreover, by means of the mold 2000 three primary optic arrays 2001 are pressed or press-molded, respectively. Subsequently, the primary optic arrays 1001 together with one primary optic array 2002 are slid into two primary optic arrays 2002, as has been represented in FIG. 36.

Figure 37:
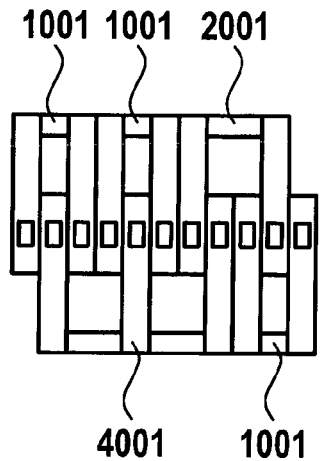
FIG. 37 shows an example of embodiment of an optical element configured as an array comprising eleven primary optics.

In order to manufacture an optical element as an array comprising eleven primary optics, three primary optics 1001 are pressed or press-molded, respectively, by means of the mold 1000, whereas, by means of the mold 2000, one primary optic array 2001 is pressed or press-molded, respectively, and, by means of the mold 4000, one primary optic array 4001 is pressed or press-molded, respectively. Subsequently, two primary optic arrays 1001 together with one primary optic array 2001 are slid into the primary optic array 4001 together with the (third) primary optic array 1001, as has been represented in FIG. 37.

Figure 38:
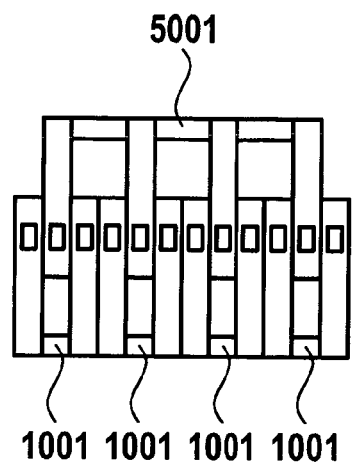
FIG. 38 shows an example of embodiment of an optical element configured as an array comprising twelve primary optics.

In order to manufacture an optical element as an array comprising twelve primary optics, four primary optic arrays 1001 as well as one primary optic array 5001 are pressed or press-molded, respectively, by means of the mold 1000 and by means of the mold 5000, respectively. Subsequently, the primary optic arrays 1001 are slid into the primary optic array 5001, as has been represented in FIG. 38.

Figure 39:
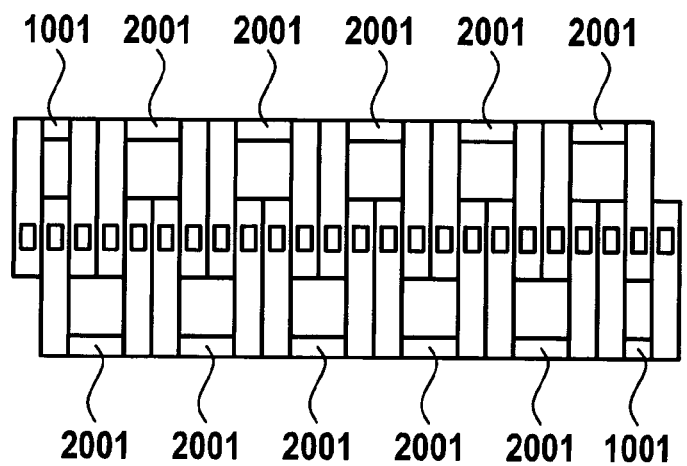
FIG. 39 shows an example of embodiment of an optical element configured as an array comprising twenty-four primary optics.
Figure 40:
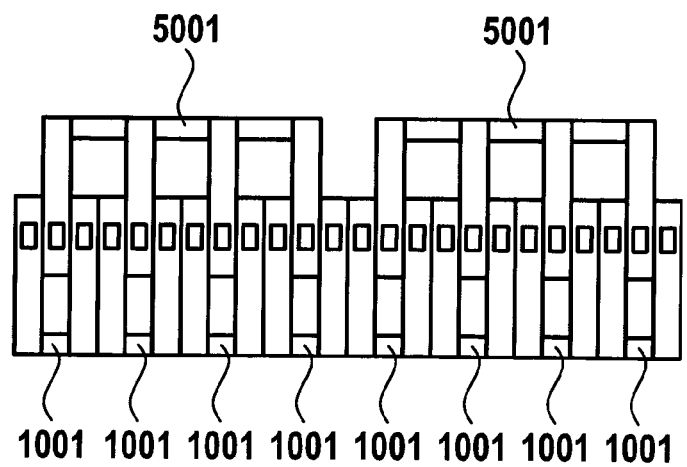
FIG. 40 shows a further example of embodiment of an optical element configured as an array comprising twenty-four primary optics.

In order to manufacture an optical element as an array comprising twenty-four primary optics, two primary optics 1001 are pressed or press-molded, respectively, by means of the mold 1000, and by means of the mold 2000 ten primary optic arrays 2001 are pressed or press-molded, respectively. Subsequently, one primary optic array 1001 together with five primary optic arrays 2001 is slid into one primary optic array 1001 together with five primary optic arrays 2001, as has been represented in FIG. 39. In an alternative embodiment, two of the optical elements as have been represented in FIG. 38 as an array comprising twelve primary optics are arranged side by side. A corresponding optical element is represented in FIG. 40. A In a further appropriate method for manufacturing optical elements for vehicle headlights, for example for motor vehicle headlights, there are provided several different mold sets or kits, as is, for example, represented in FIG. 24. Moreover, there are made available and provided for a mold, by means of which, in connection with a pressing bottom or base, a primary optic array 6001, as shown in FIG. 41, can be pressed; a mold, by means of which, in connection with a pressing bottom or base, a primary optic array 7001, as represented in FIG. 42, can be pressed; and, optionally, a mold, by means of which, in connection with a pressing bottom or base, a primary optic array 8001, as represented in FIG. 43, can be pressed.

Figure 41:
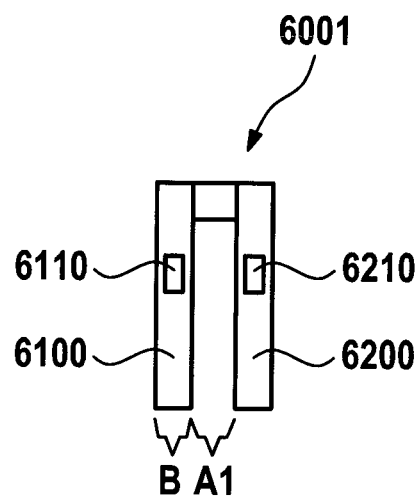
FIG. 41 shows a further example of embodiment of a primary optic array.

The monolithic (for example partially press-molded) primary optic array 6001 of inorganic glass—represented in FIG. 41—comprises a primary optic 6100 having a light entry face 6110, and a primary optic 6200 having a light entry face 6210. The distance A1 between the primary optic 6100 and the primary optic 6200 is equal to their width B plus 0.2 mm.

Figure 42:
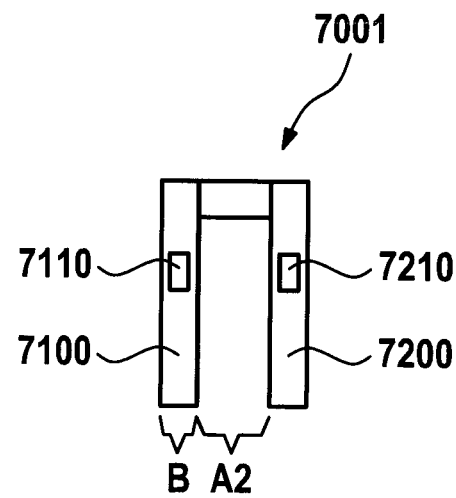
FIG. 42 shows a further example of embodiment of a primary optic array.

The monolithic (for example partially press-molded) primary optic array 7001 of inorganic glass—represented in FIG. 42—comprises a primary optic 7100 having a light entry face 7110, and a primary optic 7200 having a light entry face 7210. The distance A2 between the primary optic 7100 and the primary optic 7200 is equal to double their width B plus 0.3 mm.

Figure 43:
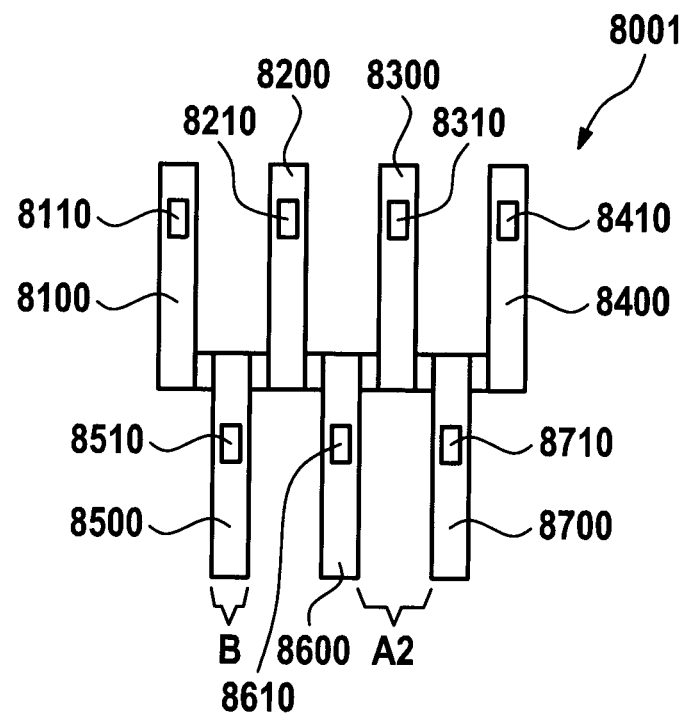
FIG. 43 shows a further example of embodiment of a primary optic array.

The monolithic (for example partially press-molded) primary optic array 8001 of inorganic glass—represented in FIG. 43—comprises a primary optic 8100 having a light entry face 8110, a primary optic 8200 having a light entry face 8210, a primary optic 8300 having a light entry face 8310, a primary optic 8400 having a light entry face 8410, a primary optic 8500 having a light entry face 8510, a primary optic 8600 having a light entry face 8610, and a primary optic 8700 having a light entry face 8710. The distance A2 between the primary optic 8100 and the primary optic 8200, between the primary optic 8200 and the primary optic 8300, between the primary optic 8300 and the primary optic 8400, between the primary optic 8500 and the primary optic 8600, as well as between the primary optic 8600 and the primary optic 8700 is equal to double their width B plus 0.3 mm.

Figure 44:
FIG. 44 shows an example of embodiment of an optical element configured as an array comprising four primary optics.

In order to manufacture an optical element as an array comprising four primary optics, a primary optic array 1001 and a primary optic array 6001 are pressed or press-molded, respectively. Subsequently, the primary optic array 1001 and the primary optic array 6001 are slid into each other, as has been represented in FIG. 44.

Figure 45:
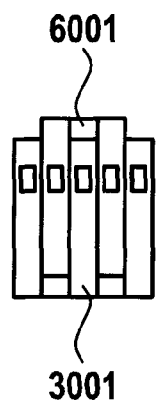
FIG. 45 shows a further example of embodiment of an optical element configured as an array comprising five primary optics.

In order to manufacture an optical element as an array comprising five primary optics, a primary optic array 6001 and a primary optic array 3001 are pressed or press-molded, respectively. Subsequently, the primary optic array 6001 and the primary optic array 3001, respectively, are slid into each other, as has been represented in FIG. 45.

Figure 46:
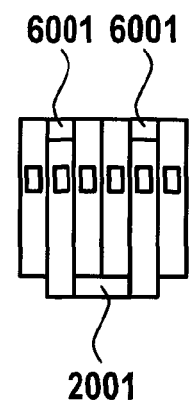
FIG. 46 shows a further example of embodiment of an optical element configured as an array comprising six primary optics.

In order to manufacture an optical element as an array comprising six primary optics, two primary optic arrays 6001 and one primary optic array 2001 are pressed or press-molded, respectively. Subsequently, the primary optic arrays 6001 are slid into the primary optic array 2001, as has been represented in FIG. 46.

Figure 47:
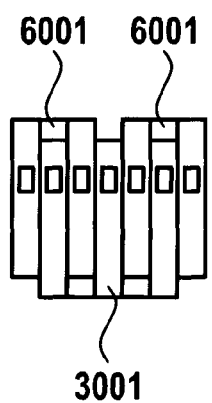
FIG. 47 shows a further example of embodiment of an optical element configured as an array comprising seven primary optics.

In order to manufacture the an optical element as an array comprising seven primary optics, two primary optic arrays 6001 and one primary optic array 3001 are pressed or press-molded, respectively. Subsequently, the primary optic arrays 6001 are slid into the primary optic array 3001, as has been represented in FIG. 47.

Figure 48:
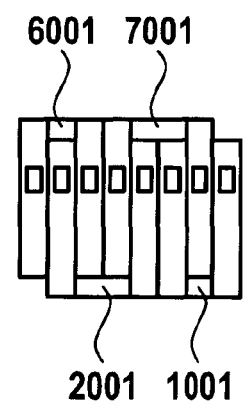
FIG. 48 shows a further example of embodiment of an optical element configured as an array comprising eight primary optics.

In order to manufacture an optical element as an array comprising eight primary optics, one primary optic array 1001, one primary optic array 2001, one primary optic array 6001, and one primary optic array 7001 are pressed or press-molded, respectively. Subsequently the primary optic arrays 6001 and 7001 are slid into the primary optic arrays 2001 and 1001, as has been represented in FIG. 48.

In order to manufacture an optical element as an array comprising nine primary optics, three primary optic arrays 6001 and one primary optic array 4001 are pressed or press-molded, respectively. Subsequently, the primary optics 6001 are slid into the primary optic array 4001, as has been represented in FIG. 49.

Figure 50:
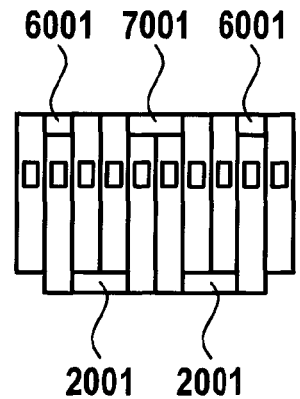
FIG. 50 shows a further example of embodiment of an optical element configured as an array comprising ten primary optics.

In order to manufacture an optical element as an array comprising ten primary optics, two primary optic arrays 2001, two primary optic arrays 6001, as well as one primary optic array 7001 are pressed or press-molded, respectively. Subsequently, the two primary optic arrays 6001, together with the primary optic array 7001, are slid into the two primary optic arrays 2001, as has been represented in FIG. 50.

Figure 51:
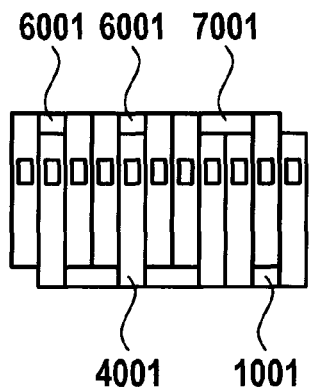
FIG. 51 shows a further example of embodiment of an optical element configured as an array comprising eleven primary optics.

In order to manufacture an optical element as an array comprising eleven primary optics, one primary optic 1001, one primary optic array 4001, two primary optic arrays 6001, as well as one primary optic array 7001 are pressed or press-molded, respectively. Subsequently, the two primary optic arrays 6001 together with the primary optic array 7001 are slid into the primary optic array 1001 and the primary optic array 1001, as has been represented in FIG. 51.

In order to manufacture an optical element as an array comprising twelve primary optics, four primary optic arrays 6001 as well as one primary optic array 5001 are pressed or press-molded, respectively. Subsequently, the primary optic arrays 6001 are slid into the primary optic array 5001, as has been represented in FIG. 52.

Figure 49:
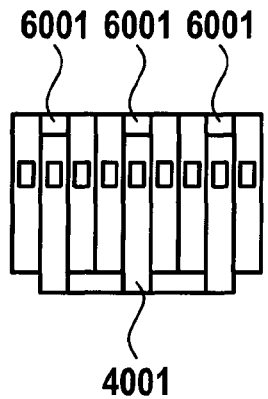
FIG. 49 shows a further example of embodiment of an optical element configured as an array comprising nine primary optics.
Figure 52:
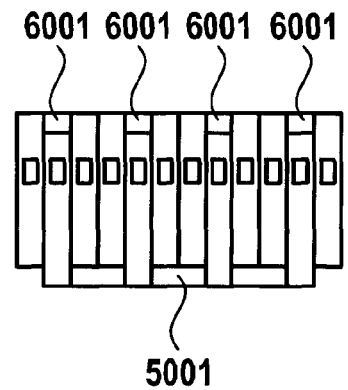
FIG. 52 shows a further example of embodiment of an optical element configured as an array comprising twelve primary optics.
Figure 53:
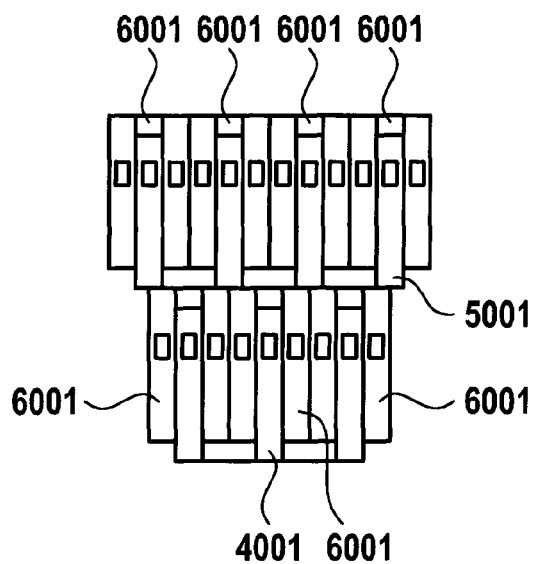
FIG. 53 shows an example of embodiment of an optical element including a double-array, the latter comprising an array incorporating nine primary optics as well as an array incorporating twelve primary optics.

In an example of embodiment for manufacturing an optical element including a double-array, the latter comprising one array incorporating nine primary optics as well as one array incorporating twelve primary optics, the optical element according to FIG. 49 and the optical element according to FIG. 52 can be assembled as has been represented in FIG. 53. Herein, the boundary surfaces (interfaces) between the primary optics of the optical element according to FIG. 52, are positioned centrally with regard to the primary optics of the optical element according to FIG. 49. In this manner, it is possible to create a particularly homogeneous light distribution.

Figure 54:
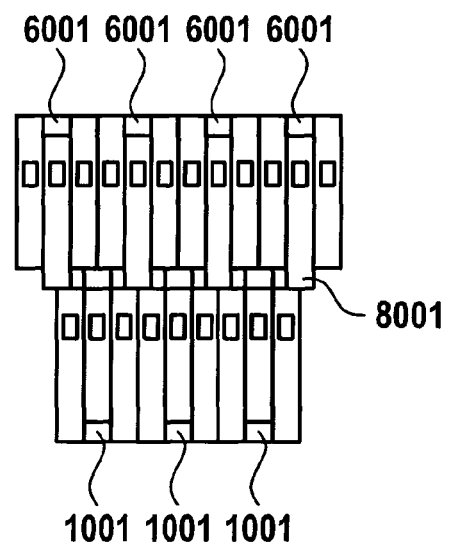
FIG. 54 shows a further example of embodiment of an optical element including a double-array, the latter comprising an array incorporating nine primary optics as well as an array incorporating twelve primary optics.

In a particularly appropriate method for manufacturing an optical element including a double-array, which comprises one array incorporating twelve primary optics and one array incorporating nine primary optics, three primary optic arrays 1001, four primary optic arrays 6001, as well as one primary optic array 8001 are pressed or press-molded, respectively. Subsequently, as has been represented in FIG. 54, the primary optic arrays 6001 are, on one side, pushed into the primary optic array 8001, whereas the primary optic arrays 1001 are, on the other side (opposite side) of the primary optic array 8001, pushed into the primary optic array 8001. It is possible to obtain a particularly homogeneous light distribution with the optical element according to FIG. 54 as well.

It is possible that the webs of the primary optics 1001, 2001, 3001, 4001, and 5001 differ from the webs of the primary optics 6001 and 7001. In this context, the webs may differ regarding height and/or width or in respect of their shapes (round, angled etc.). The different configuration of the webs may help to prevent mistakes during assembly.

Before the pressing of the primary optic arrays multicavity tools may be provided for or be applied, respectively, by means of which two or more primary optic arrays may be pressed or press-molded, respectively, by means of one mold or one set or kit of molds, respectively.

The invention claimed is:
1. An optical element for a vehicle headlight, the optical element including:
   a monolithically pressed first primary optic array of transparent glass material; and at least one monolithically pressed second primary optic array of a transparent material, wherein the first primary optic array comprises:
  a first primary optic having a light entry face and a light exit face;
  at least one second primary optic having a light entry face and a light exit face;
  and a web connecting the first primary optic mechanically to the second primary optic;
  wherein the second primary optic array comprises:
  a third primary optic having a light entry face and a light exit face;
  wherein the first primary optic array and the second primary optic array are positioned and fixed with respect to each other such that they engage each other to form an array, in which the third primary optic is arranged between the first primary optic and the second primary optic;
  and wherein the distance between the first primary optic and the third primary optic is no more than 0.5 mm and the distance between the second primary optic and the third primary optic is no more than 0.5 mm.

2. The optical element as claimed in claim 1, the second primary optic array further comprising:
  at least one fourth primary optic having a light entry face and a light exit face; and
  a web connecting the third primary optic mechanically to the fourth primary optic.

3. The optical element as claimed in claim 2, wherein the second primary optic is arranged between the third primary optic and the fourth primary optic.

4. The optical element as claimed in claim 3, wherein the distance between the second primary optic and the third primary optic amounts to no more than 0.5 mm, and the first primary optic and the third primary optic amounts to no more than 0.5 mm.

5. The optical element as claimed in claim 1, wherein the transparent material is inorganic glass.

6. The optical element as claimed in claim 5, the second primary optic array further comprising:
  at least one fourth primary optic having a light entry face and a light exit face; and
  a web connecting the third primary optic mechanically to the fourth primary optic.

7. The optical element as claimed in claim 6, wherein the second primary optic is arranged between the third primary optic and the fourth primary optic.

8. The optical element as claimed in claim 7, wherein the first primary optic, the second primary optic, the third primary optic or the fourth primary optic comprises a press-molded surface between their respective light entry face and their light exit face for the total reflection of light irradiated into the light entry surface.

9. The optical element as claimed in claim 7, wherein the distance between
  the second primary optic and the third primary optic amounts to no more than 0.5 mm;
  the second primary optic and the fourth primary optic amounts to no more than 0.5 mm; or
  the first primary optic and the third primary optic amounts to no more than 0.5 mm.

10. The optical element as claimed in claim 7, wherein the first primary optic, the second primary optic, the third primary optic and the fourth primary optic comprise a press-molded surface between their respective light entry face and their light exit face for the total reflection of light irradiated into the light entry surface.

11. The optical element as claimed in claim 10, wherein the distance between
  the second primary optic and the third primary optic amounts to no more than 0.5 mm;
  the second primary optic and the fourth primary optic amounts to no more than 0.5 mm; and
  the first primary optic and the third primary optic amounts to no more than 0.5 mm.

12. An optical element for a vehicle headlight, the optical element including a monolithically pressed first primary optic array of inorganic glass, including a monolithically pressed second primary optic array of inorganic glass, and including at least one monolithically pressed third primary optic array of inorganic glass, wherein the first primary optic array comprises:
  a first primary optic having a light entry face and a light exit face;
  at least one second primary optic having a light entry face and a light exit face; and
  a web connecting the first primary optic mechanically to the second primary optic;
  wherein the second primary optic array comprises:
  a third primary optic having a light entry face and a light exit face;
  at least one fourth primary optic having a light entry face and a light exit face and
  a web connecting the third primary optic mechanically to the fourth primary optic;
  wherein the third primary optic array comprises:
  a fifth primary optic having a light entry face and a light exit face;
  at least one sixth primary optic having a light entry face and a light exit face; and
  a web connecting the fifth primary optic mechanically to the sixth primary optic wherein the first primary optic array, the second primary optic array, and the third primary optic array are positioned and fixed with respect to each other such that they engage each other such that they form an array, in which
  the first primary optic is arranged between the third primary optic and the fourth primary optic,
  the second primary optic is arranged between the fifth primary optic and the sixth primary optic, and
  the fourth primary optic and the fifth primary optic are arranged between the first primary optic and the second primary optic.

13. The optical element as claimed in claim 12, wherein the distance between
  the first primary optic and the third primary optic amounts to no more than 0.5 mm;
  the first primary optic and the fourth primary optic amounts to no more than 0.5 mm;
  the second primary optic and the fifth primary optic amounts to no more than 0.5 mm;
  the second primary optic and the sixth primary optic amounts to no more than 0.5 mm; or
  the fourth primary optic and the fifth primary optic amounts to no more than 0.5 mm.

14. The optical element as claimed in claim 12, the first primary optic array further comprising:
  a seventh primary optic including a light entry face and a light exit face, wherein the first primary optic and the second primary optic are arranged on a first side of the web of the first primary optic array, and wherein the seventh primary optic is arranged on a second side of the web of the first primary optic array, which second side lies opposite to the first side of the web of the first primary optic array, wherein the transition from the seventh primary optic to the web of the first primary optic array is arranged between the transition from the first primary optic to the web of the first primary optic array and the transition from the second primary optic to the web of the first primary optic array.

15. The optical element as claimed in claim 12, the first primary optic array further comprising:
a seventh primary optic including a light entry face and a light exit face, wherein the first primary optic and the second primary optic are arranged on a first side of the web of the first primary optic array, and wherein the seventh primary optic is arranged on a second side of the web of the first primary optic array, which second side lies opposite to the first side of the web of the first primary optic array, wherein the transition from the seventh primary optic to the web of the first primary optic array is arranged centrally between the transition from the first primary optic to the web of the first primary optic array and the transition from the second primary optic to the web of the first primary optic array.

16. The optical element as claimed in claim 12, wherein the distance between
the first primary optic and the third primary optic amounts to no more than 0.5 mm;
the first primary optic and the fourth primary optic amounts to no more than 0.5 mm;
the second primary optic and the fifth primary optic amounts to no more than 0.5 mm;
the second primary optic and the sixth primary optic amounts to no more than 0.5 mm; and
the fourth primary optic and the fifth primary optic amounts to no more than 0.5 mm.

17. The optical element as claimed in claim 16, the first primary optic array further comprising:
a seventh primary optic including a light entry face and a light exit face, wherein the first primary optic and the second primary optic are arranged on a first side of the web of the first primary optic array, and wherein the seventh primary optic is arranged on a second side of the web of the first primary optic array, which second side lies opposite to the first side of the web of the first primary optic array, wherein the transition from the seventh primary optic to the web of the first primary optic array is arranged between the transition from the first primary optic to the web of the first primary optic array and the transition from the second primary optic to the web of the first primary optic array.

18. The optical element as claimed in claim 12, wherein the first primary optic, the second primary optic, the third primary optic, the fourth primary optic, the fifth primary optic, and the sixth primary optic comprise, between their light entry faces and their light exit faces, a press-molded surface for the total reflection of light irradiated into the light entry face.

19. The optical element as claimed in claim 14, wherein the first primary optic, the second primary optic, the third primary optic, the fourth primary optic, the fifth primary optic, the sixth primary optic, and the seventh primary optic comprise, between their light entry faces and their light exit faces, a press-molded surface for the total reflection of light irradiated into the light entry face.

20. An optical element for a vehicle headlight, the optical element including:
a monolithically pressed first primary optic array of inorganic glass;
a monolithically pressed second primary optic array of inorganic glass; and
at least one monolithically pressed third primary optic array of inorganic glass, wherein the first primary optic array comprises:
a first primary optic having a light entry face and a light exit face;
at least one second primary optic having a light entry face and a light exit face; and
a web connecting the first primary optic mechanically to the second primary optic;
wherein the third primary optic array comprises:
a third primary optic having a light entry face and a light exit face;
at least one fourth primary optic having a light entry face and a light exit face; and
a web connecting the third primary optic mechanically to the fourth primary optic;
wherein the second primary optic array comprises:
a fifth primary optic having a light entry face and a light exit face;
a sixth primary optic having a light entry face and a light exit face;
at least one seventh primary optic having a light entry face and a light exit face; and
a web connecting the fifth primary optic, the sixth primary optic, and the seventh primary optic mechanically to each other such that the fifth primary optic and the seventh primary optic are arranged on a first side, and that the sixth primary optic is arranged on a second side of the web, which side lies opposite to the first side of the web, wherein the transition from the sixth primary optic to the web lies between the transition from the fifth primary optic to the web and the transition from the seventh primary optic to the web;
wherein the first primary optic array, the second primary optic array and the third primary optic array are positioned and fixed with respect to each other such that they engage each other to form a first array, in which the second primary optic is arranged between the fifth primary optic and the seventh primary optic; and
the fifth primary optic is arranged between the first primary optic and the second primary optic; and
to form a second array, in which the sixth primary optic is arranged between the third primary optic and the fourth primary optic.

21. The optical element as claimed in claim 20, wherein the distance between
the second primary optic and the fifth primary optic amounts to no more than 0.5 mm;
the second primary optic and the seventh primary optic amounts to no more than 0.5 mm;
the first primary optic and the fifth primary optic amounts to no more than 0.5 mm;
the sixth primary optic and the third primary optic amounts to no more than 0.5 mm; or
the sixth primary optic and the fourth primary optic amounts to no more than 0.5 mm.

22. The optical element as claimed in claim 20, wherein the distance between
the second primary optic and the fifth primary optic amounts to no more than 0.5 mm;
the second primary optic and the seventh primary optic amounts to no more than 0.5 mm;
the first primary optic and the fifth primary optic amounts to no more than 0.5 mm;

the sixth primary optic and the third primary optic amounts to no more than 0.5 mm; and
the sixth primary optic and the fourth primary optic amounts to no more than 0.5 mm.

23. A vehicle headlight comprising
a lens having a focal point refracting light received from an optical element into a beam pattern directed to a field to be illuminated, the optical element including:
 a monolithically pressed first primary optic array of transparent material; and
 at least one monolithically pressed second primary optic array of a transparent material, wherein the first primary optic array comprises:
 a first primary optic having a light entry face and a light exit face;
 at least one second primary optic having a light entry face and a light exit face;
 and a web connecting the first primary optic mechanically to the second primary optic;
wherein the second primary optic array comprises:
 a third primary optic having a light entry face and a light exit face;
wherein the first primary optic array and the second primary optic array are positioned and fixed with respect to each other such that they engage each other to form an array, in which the third primary optic is arranged between the first primary optic and the second primary optic;
and wherein the distance between the first primary optic and the third primary optic is no more than 0.5 mm and the distance between the second primary optic and the third primary optic is no more than 0.5 mm.

* * * * *